United States Patent
Yasu

(10) Patent No.: US 11,340,775 B2
(45) Date of Patent: May 24, 2022

(54) INPUT DEVICE FOR TOUCHSCREEN WITH MAGNETIC SHEET AND MAGNETIZED OBJECTS

(71) Applicant: NIPPON TELEGRAPH AND TELEPHONE CORPORATION, Tokyo (JP)

(72) Inventor: Kentaro Yasu, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/268,934

(22) PCT Filed: Aug. 8, 2019

(86) PCT No.: PCT/JP2019/031287
§ 371 (c)(1),
(2) Date: Feb. 16, 2021

(87) PCT Pub. No.: WO2020/039949
PCT Pub. Date: Feb. 27, 2020

(65) Prior Publication Data
US 2021/0181913 A1    Jun. 17, 2021

(30) Foreign Application Priority Data
Aug. 23, 2018   (JP) .............................. JP2018-155993

(51) Int. Cl.
*G06F 3/0488* (2022.01)
*G06F 3/0362* (2013.01)
(Continued)

(52) U.S. Cl.
CPC .......... *G06F 3/0488* (2013.01); *G06F 3/0362* (2013.01); *G06F 3/041* (2013.01); *G06F 3/0484* (2013.01)

(58) Field of Classification Search
None
See application file for complete search history.

(56) References Cited

U.S. PATENT DOCUMENTS 6,102,397 A * 8/2000 Lee ..................... A63F 3/00643
273/238
2006/0175753 A1* 8/2006 MacIver ............. A63F 3/00643
273/237
(Continued)

FOREIGN PATENT DOCUMENTS

JP    2000-207114 A    7/2000
WO   2008/111505 A1   9/2008

OTHER PUBLICATIONS

"Development of "write" and magnetic tactile printing technology for flat sheets with an uneven texture", Nippon Telegraph and Telephone Corporation, [online], Feb. 13, 2018, accessed Sep. 12, 2019, Internet, Retrieved from: URL:http://www.ntt.co.jp/news2018/1802/180213a.html; with translation generated by machine.
(Continued)

*Primary Examiner* — Amare Mengistu
*Assistant Examiner* — Sarvesh J Nadkarni

(57) ABSTRACT

A presented force sense is associated with an input of an operator to a touch panel. An input to the touch panel is performed using a touch panel input device including: a first object including a first surface, a first texture including a region of an S-pole and a region of an N-pole being previously magnetized on the first surface, a plate surface on an opposite side to the first surface being disposed to face an input surface of the touch panel; and a second object including a magnetic sheet and a conductive portion, the magnetic sheet including a second surface, a second texture including a region of an S-pole and a region of an N-pole being previously magnetized on the second surface, the second surface being disposed to face the first surface, the
(Continued)

conductive portion forming a conductive pattern on the second surface, the second object being operated by an operator performing an input operation on the touch panel.

7 Claims, 18 Drawing Sheets

(51) Int. Cl.
    *G06F 3/041*           (2006.01)
    *G06F 3/0484*         (2022.01)

(56) References Cited

U.S. PATENT DOCUMENTS

| | | | |
|---|---|---|---|
| 2007/0138806 A1* | 6/2007 | Ligtenberg | H05K 5/0221 |
| | | | 292/251.5 |
| 2008/0024464 A1* | 1/2008 | West | G06F 3/03548 |
| | | | 345/184 |
| 2010/0013786 A1 | 1/2010 | Nishikawa et al. | |
| 2014/0327659 A1* | 11/2014 | Chen | G06F 3/0346 |
| | | | 345/179 |
| 2020/0004345 A1* | 1/2020 | Ju | G06F 3/0362 |
| 2020/0050273 A1* | 2/2020 | Yasu | G06F 3/03545 |

OTHER PUBLICATIONS

Kentaro Yasu (2017) "Magnetic Plotter: A Macrotexture Design Method Using Magnetic Rubber Sheets", CHI2017, May 2017, pp. 4983-4993.

* cited by examiner

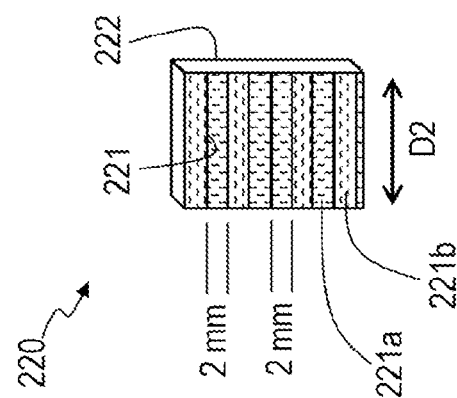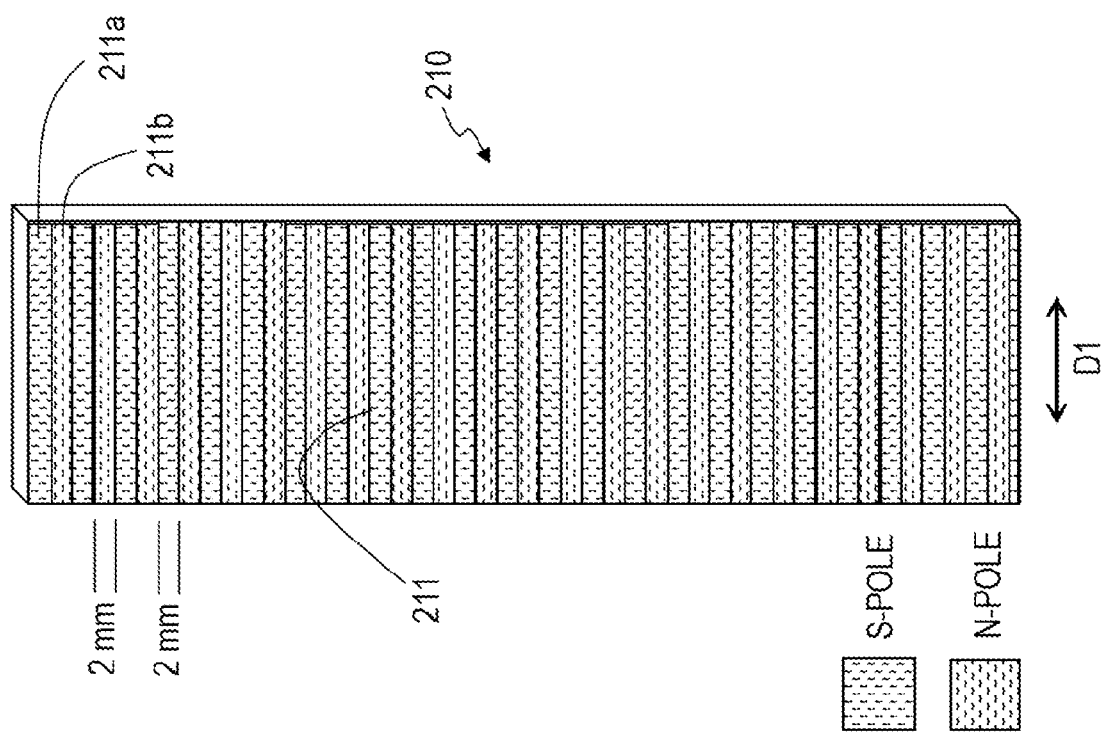

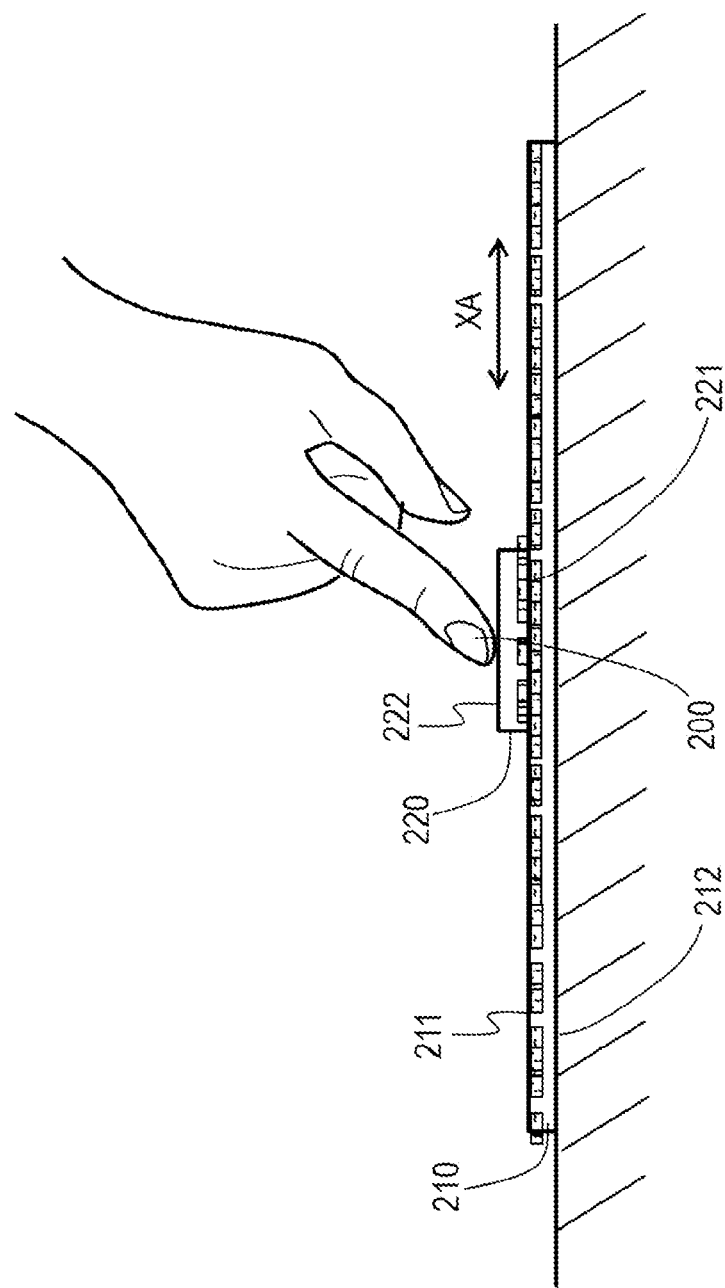

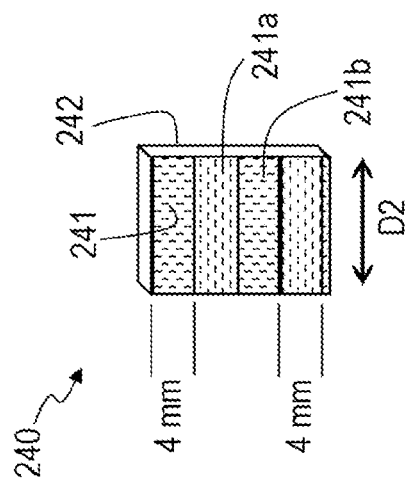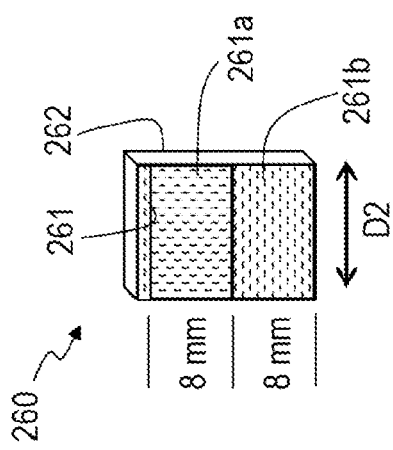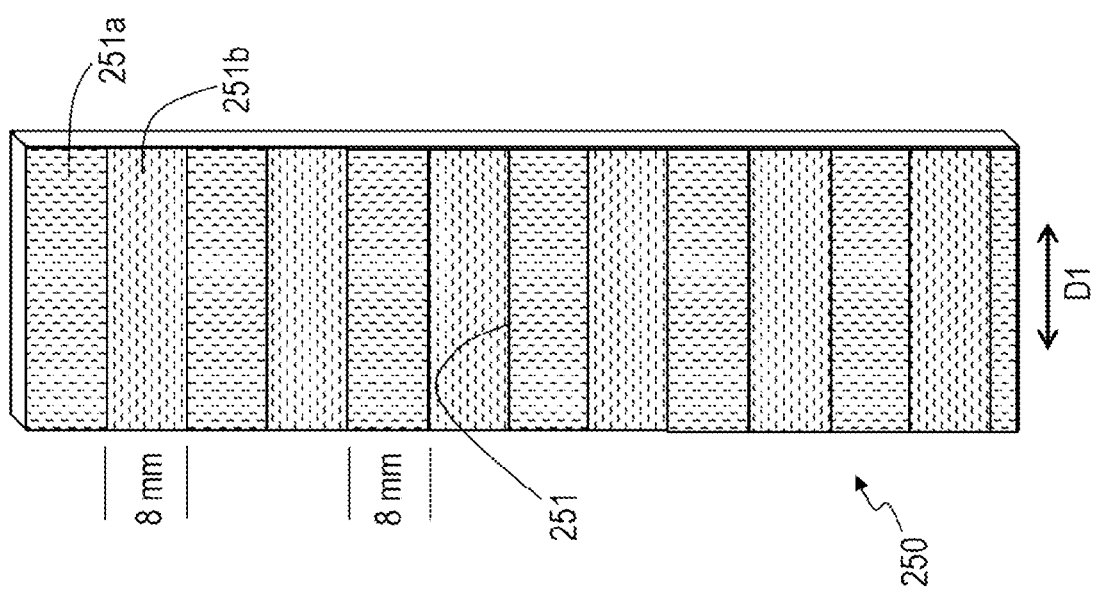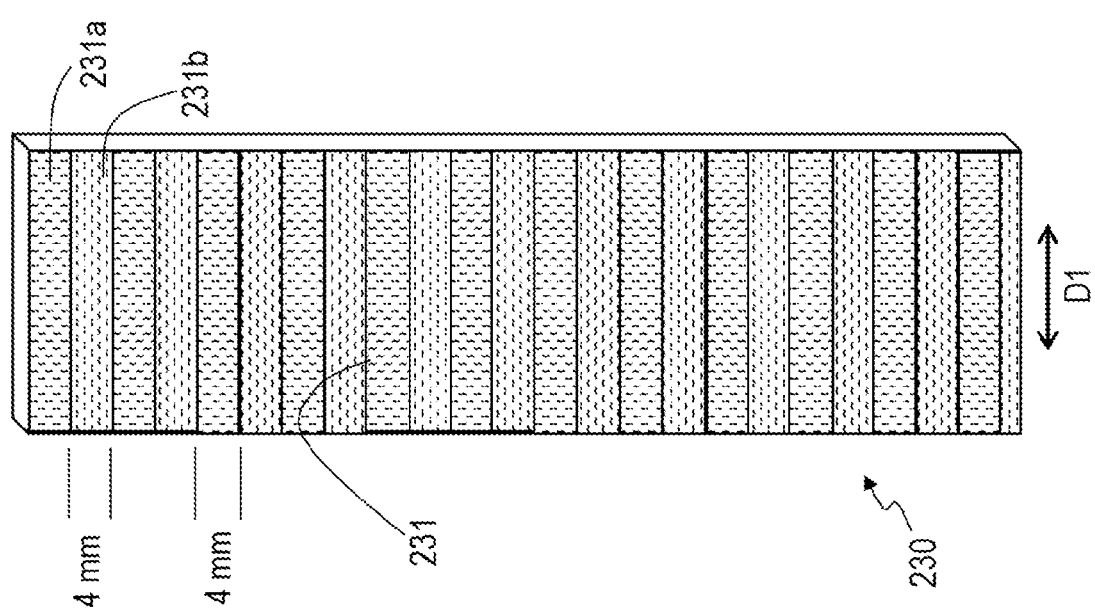

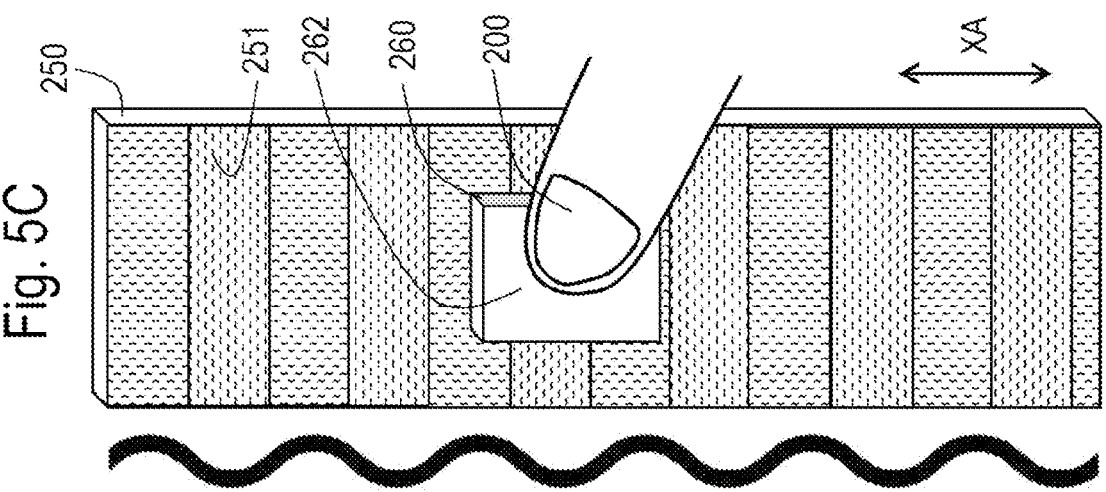
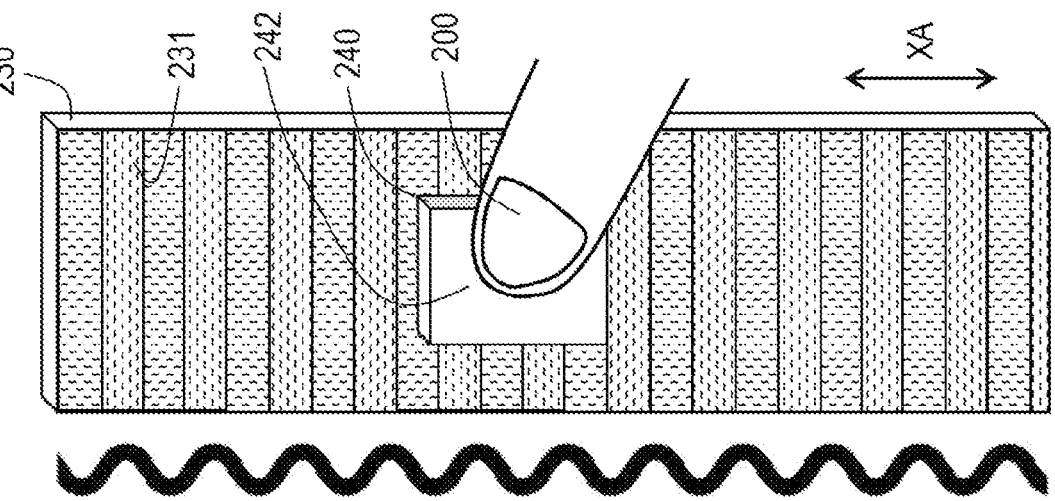
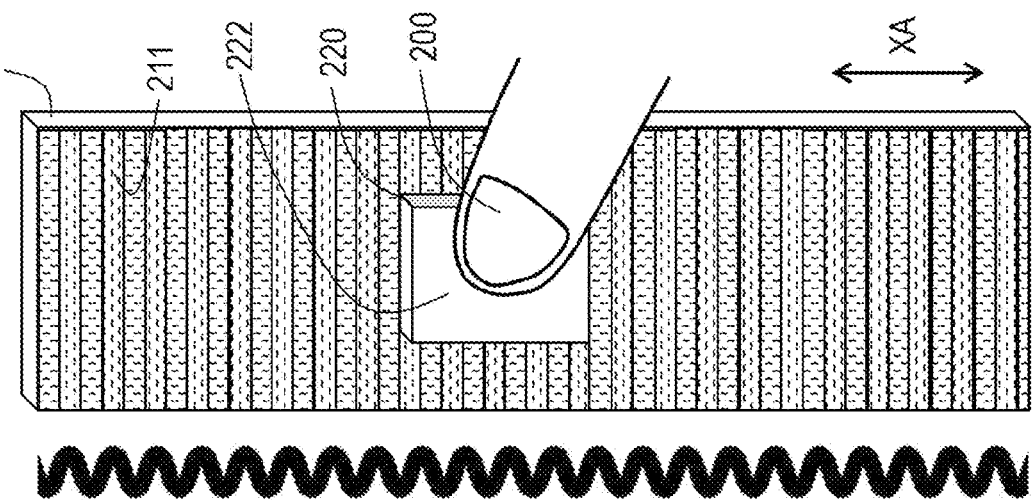

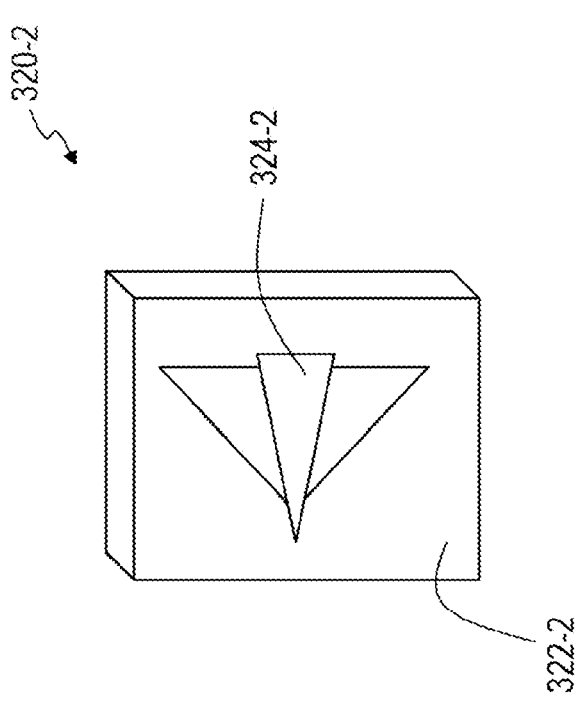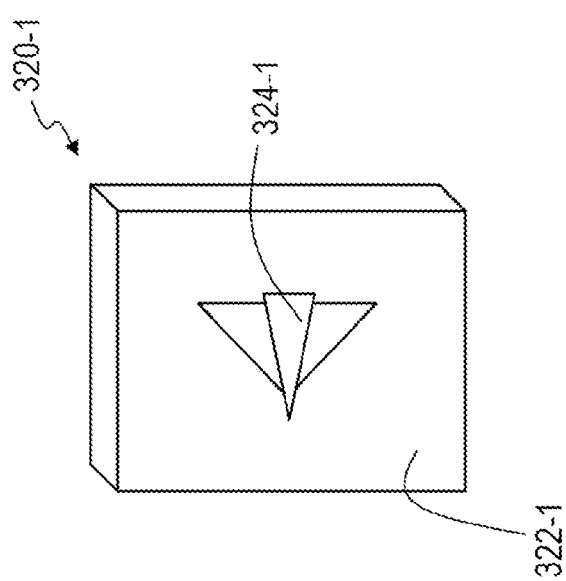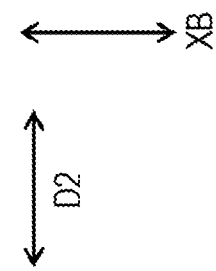
Fig. 10

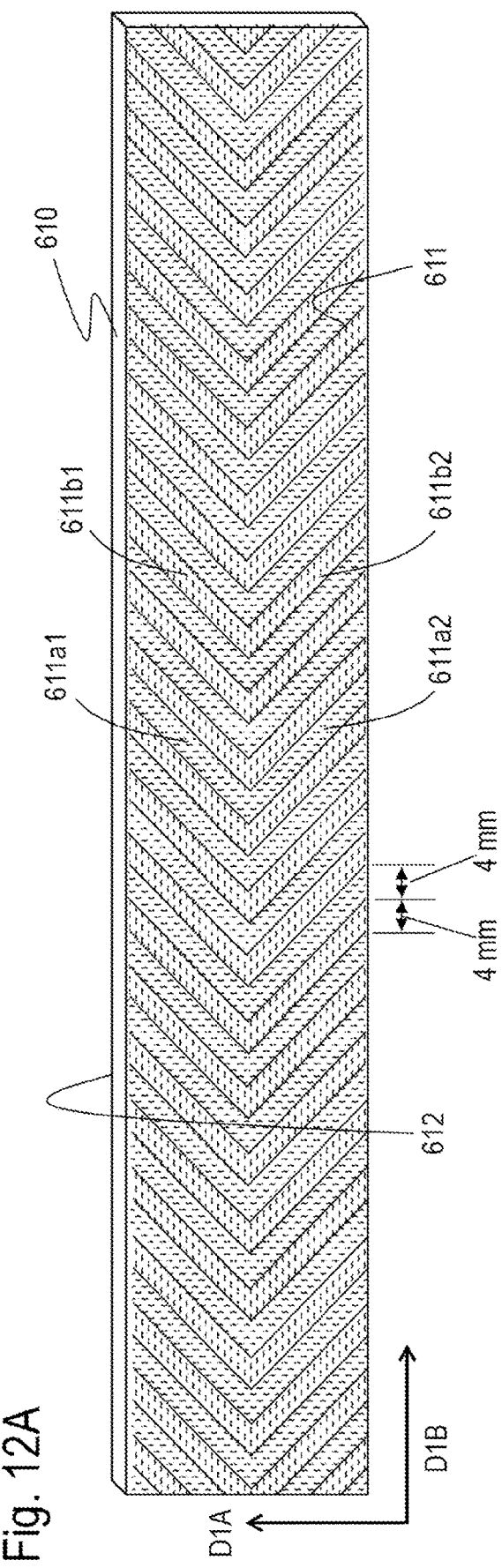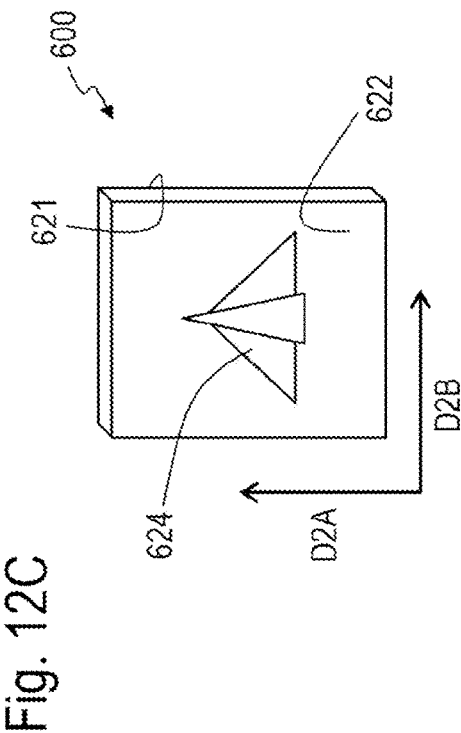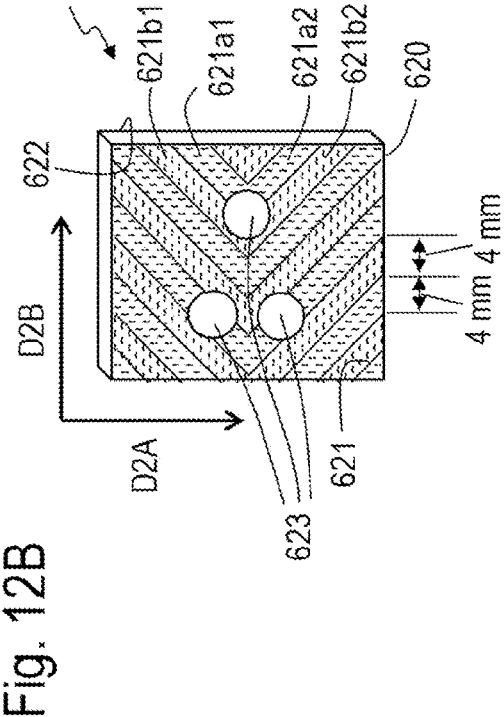

INPUT DEVICE FOR TOUCHSCREEN WITH MAGNETIC SHEET AND MAGNETIZED OBJECTS

CROSS-REFERENCE TO RELATED APPLICATIONS

This application is a U.S. 371 Application of International Patent Application No. PCT/JP2019/031287, filed on 8 Aug. 2019, which application claims priority to and the benefit of JP Application No. 2018-155993, filed on 23 Aug. 2018, the disclosures of which are hereby incorporated herein by reference in their entireties.

TECHNICAL FIELD

The present invention relates to a technique for performing input to a touch panel while presenting a force sense.

BACKGROUND ART

Patent Literature 1 discloses a technique for feedbacking a force sense to an operator of a pen tablet that is an input device. In the technique described in Patent Literature 1, any force sense can be presented by a magnetic field generated using an electromagnet, but a power source for driving the electromagnet is necessary.

Non Patent Literature 1 discloses a technique in which an operator presses with a finger and moves a magnetic sheet in which regions of the S-pole and regions of the N-pole are previously magnetized in a stripe pattern or a checker pattern so as to be brought into contact with another magnetic sheet in which regions of the S-pole and regions of the N-pole are previously magnetized in a stripe pattern or a checker pattern, thereby presenting a force sense without using an electromagnet. In particular, Non Patent Literature 1 discloses a technique for presenting different force senses by making the width of the regions of the S-pole different from the width of the regions of the N-pole in the magnetization pattern of one or both of the magnetic sheets.

CITATION LIST

Patent Literature

Patent Literature 1: JP 2000-207114 A

Non Patent Literature

Non Patent Literature 1: Kentaro Yasu, "Magnetic Plotter: A Macrotexture Design Method Using Magnetic Rubber Sheets", CHI2017, 2017 May 12, pp. 4983-4993.

SUMMARY OF THE INVENTION

Technical Problem

According to the technique disclosed in Patent Literature 1, the force sense is presented when the operator performs an input operation to the input device, and the force sense corresponds to the brightness of the screen of the display device. Therefore, in the technique disclosed in Patent Literature 1, the force sense presented to the operator and the input by the operator are independent of each other. In the technique disclosed in Non Patent Literature 1, although the force sense is presented to the operator, the operation itself performed on the input device is not taken into consideration. An object of the present invention is to associate a presented force sense with an input by an operator to a touch panel.

Means for Solving the Problem

An input to a touch panel is performed using a touch panel input device for performing input to a touch panel, the touch panel input device including: a first object including a first surface, a first texture including a region of an S-pole and a region of an N-pole being previously magnetized on the first surface, a plate surface on an opposite side to the first surface being disposed to face an input surface of the touch panel; and a second object including a magnetic sheet including a second surface, a second texture including a region of an S-pole and a region of an N-pole being previously magnetized on the second surface, the second surface being disposed to face the first surface, and a conductive portion forming a conductive pattern on the second surface, the second object being operated by an operator performing an input operation on the touch panel.

Effects of the Invention

The present invention can associate a presented force sense with an input by an operator to a touch panel.

BRIEF DESCRIPTION OF DRAWINGS

FIGS. 1A and 1B are diagrams illustrating examples of magnetized magnetic sheets.

FIG. 3 is a diagram illustrating an example of an action of presenting a feeling of unevenness by the two magnetic sheets.

FIGS. 4A to 4D are diagrams illustrating examples of the magnetized magnetic sheets.

FIGS. 5A to 5C are diagrams illustrating examples of an action of presenting a feeling of unevenness by the two magnetic sheets.

FIG. 10 is a diagram illustrating examples of the second objects.

FIG. 12A is a diagram illustrating an example of the magnetized magnetic sheet. FIGS. 12B and 12C are diagrams illustrating an example of the second object.

DESCRIPTION OF EMBODIMENTS

Figure 2:
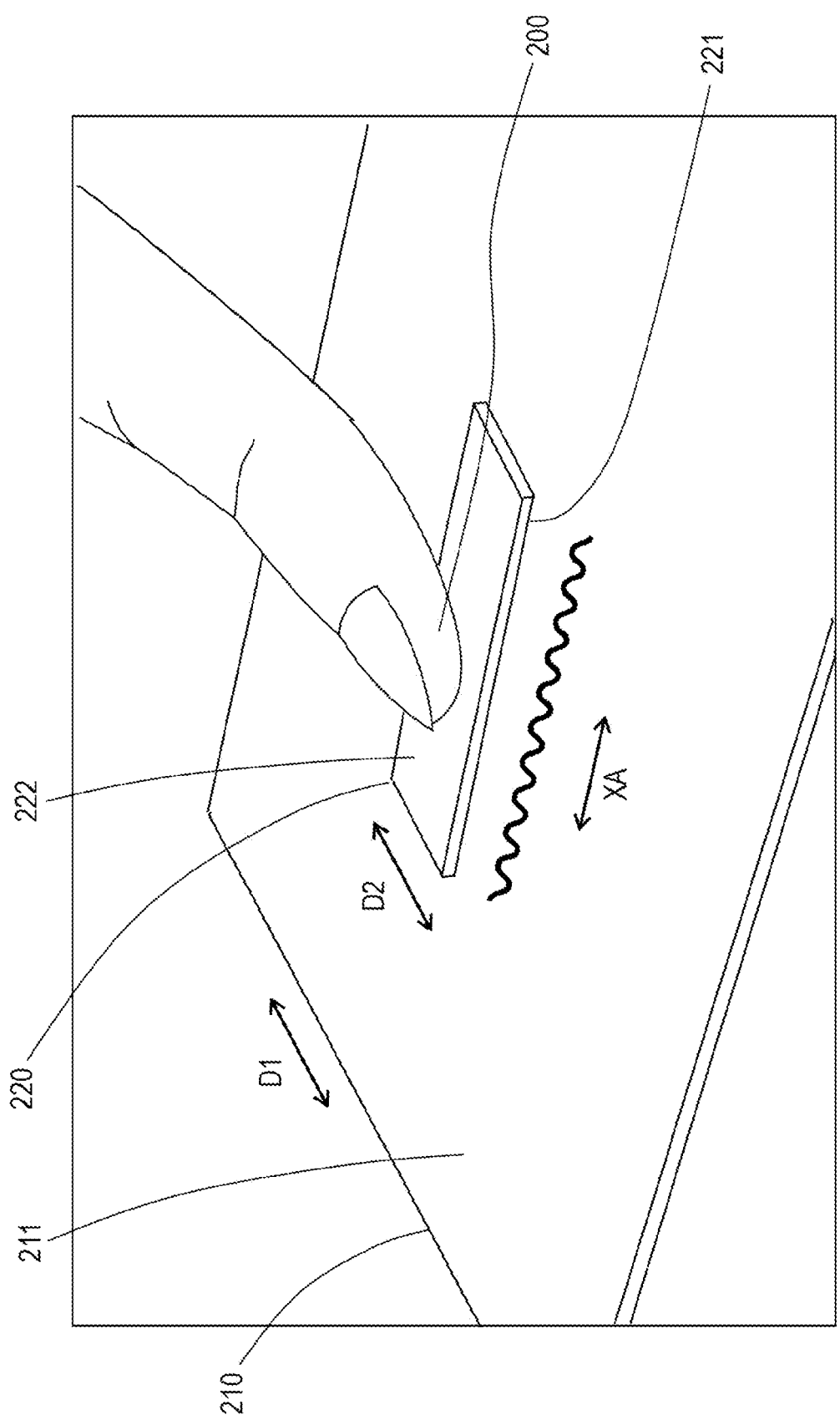
FIG. 2 is a diagram illustrating an example of an action of presenting a feeling of unevenness by two magnetic sheets.

First, a force sense presentation object disclosed in Non Patent Literature 1 used in the present invention will be described.

According to the technique disclosed in Non Patent Literature 1, unevenness is perceived using two objects magnetized in a pattern of the S-pole and the N-pole. The force sense presentation object disclosed in Non Patent Literature 1 includes a "first object" and a "second object". The "first object" includes a "first surface", and a "first texture" including a region of the S-pole and a region of the N-pole is magnetized on the "first surface". The "second object" includes a "second surface", and a "second texture" including a region of the S-pole and a region of the N-pole is magnetized on the "second surface". An operator ("action entity"), which is a human or any animal other than the human, perceives unevenness by performing a following operation and/or a following action with a following state maintained. Here, the following state is a state in which the "action entity" is in contact with at least one of the "first object" and the "second object" to bring the "first surface" and the "second surface" into contact with or proximity to each other. The following operation is an operation of changing the relative positional relationship between the "first surface" and the "second surface". The following action is an action of changing the relative positional relationship between the "first surface" and the "second surface". In other words, a shear stress that the "action entity" receives from at least one of the "first object" and the "second object" periodically changes by performing a following operation and/or a following action with a following state maintained. Here, the following state is a state in which the "action entity" is in contact with at least one of the "first object" and the "second object" to bring the "first surface" and the "second surface" into contact with or proximity to each other. The following operation is an operation of changing the relative positional relationship between the "first surface" and the "second surface". The following action is an action of changing the relative positional relationship between the "first surface" and the "second surface". The change in the shear stress is a change in the linear direction included in a plane along the "first surface" and the "second surface", but the "action entity" perceives this change as (an illusion of) unevenness substantially perpendicular to the "first surface" and the "second surface". In examples of the "first texture" and the "second texture", regions magnetized to the S-pole and regions magnetized to the N-pole are alternately and periodically disposed. For example, the "first texture" and the "second texture" may be regions on which band-like regions magnetized to the S pole and band-like regions magnetized to the N pole are periodically arranged in an alternate manner, or may include periodic substantially checkered regions magnetized to the S-pole and periodic substantially checkered regions magnetized to the N-pole. The pattern of the "first texture" may be the same as or different from the pattern of the "second texture". How the shear stress that the "action entity" receives from at least one of the "first object" and the "second object" changes is different depending on a combination of the pattern of the "first texture" and the pattern of the "second texture", which makes different a feeling of unevenness perceived by the "action entity". How the shear stress that the "action entity" receives from at least one of the "first object" and the "second object" may be different depending on a direction in which the relative positional relationship between the "first surface" and the "second surface" is changed. In this case, a feeling of unevenness perceived by the "action entity" is also different depending on a direction in which the relative positional relationship between the "first surface" and the "second surface" is changed. For example, tape-like regions magnetized to the S pole and tape-like regions magnetized to the N pole may be periodically arranged in an alternate manner on the "first texture" and the "second texture", and a following operation and/or a following action may be performed with a following state maintained. The following state is a state in which the "first surface" and the "second surface" are in contact with or proximity to each other such that the long-side direction of the tape-like regions of the "first texture" matches the long-side direction of the tape-like regions of the "second texture". The following operation is an operation of changing the relative positional relationship between the "first surface" and the "second surface". The following action is an action of changing the relative positional relationship between the "first surface" and the "second surface". In this case, how the shear stress that the "action entity" receives from at least one of the "first object" and the "second object" changes is different depending on whether the relative positional relationship between the "first surface" and the "second surface" is changed in the long-side direction of the tape-like regions or in the short-side direction of the tape-like regions, which makes different a feeling of unevenness perceived by the "action entity". Note that an example of the operation of changing the relative positional relationship between the "first surface" and the "second surface" and/or the action of changing the relative positional relationship between the "first surface" and the "second surface" is an action of moving the "second object" by the "action entity" to change the relative positional relationship between the "first surface" and the "second surface". Here, "changing the relative positional relationship between the first surface and the second surface" is, for example, sliding the "second surface" relative to the "first surface".

Hereinafter, specific examples of the present technique will be described with reference to the drawings.

A magnetic sheet 210 in FIG. 1A is a specific example of the "first object", and a magnetic sheet 220 in FIG. 1B is a specific example of the "second object". On one surface (plate surface) 211 (first surface) of the magnetic sheet 210, a texture (first texture) including regions 211a of the S-pole and regions 211b of the N-pole is magnetized. The band-like (tape-like) regions 211a magnetized to the S-pole and the band-like (taped) regions 211b magnetized to the N-pole are alternately and periodically disposed on the surface 211. Similarly, on one surface (plate surface) 221 (second surface) of the magnetic sheet 220, a texture (second texture) including regions 221a of the S-pole and regions 221b of the N-pole is magnetized. The band-like (tape-like) regions 221a magnetized to the S-pole and the band-like (taped) regions 221b magnetized to the N-pole are alternately and periodically disposed on the surface 221. In this example, all of the width (pitch) in the short-side direction of the region 211a, the width (pitch) in the short-side direction of the region 211b, the width (pitch) in the short-side direction of the region 221a, and the width (pitch) in the short-side direction of the region 221b are 2 mm. In FIGS. 1A and 1B, different graphic patterns represent different polarities of the regions 211a, 211b, 221a, and 221b. This does not mean that the regions 211a, 211b, 221a, and 221b are painted in a visually distinguishable manner. That is, these textures are magnetization patterns and are not patterns painted in a visually distinguishable manner (the same applies to the following). The magnetic sheets 210 and 220 are magnetized by, for example, the method disclosed in Non Patent Literature 1. However, the magnetic sheets 210 and 220 may be magnetized by any other method (the same applies to the following).

As illustrated in FIG. 2, FIG. 3, and FIG. 5A, the operator (action entity) disposes the magnetic sheet 210 such that the surface 211 faces outward, and disposes the magnetic sheet 220 such that the surface 221 contacts the surface 211. The magnetic sheet 220 is disposed on the magnetic sheet 210 such that a long-side direction D1 of the regions 211a and 211b of the magnetic sheet 210 matches a long-side direction D2 of the regions 221a and 221b of the magnetic sheet 220. For example, the magnetic sheet 220 is disposed on the magnetic sheet 210 such that the long-side direction D1 is along the long-side direction D2 (in other words, the long-side direction D1 and the long-side direction D2 are substantially parallel to each other). The operator performs an operation of changing the relative positional relationship between the surface 211 and the surface 221 while touching, with a finger 200, the other surface 222 of the magnetic sheet 220 disposed on the magnetic sheet 210 and bringing the surface 211 and the surface 221 into contact with or proximity to (substantially contact with) each other. In the examples in FIGS. 2 and 3, the relative positional relationship between the surface 211 and the surface 221 is changed in the direction XA, which is the short-side direction of the regions 211a and 211b of the magnetic sheet 210. This periodically changes a shear stress in the direction XA received by the operator from the magnetic sheet 220. As a result, the operator perceives a feeling of unevenness in a direction substantially orthogonal to the surface 221. Note that when the relative positional relationship between the surface 211 and the surface 221 is changed in the long-side direction of the regions 211a and 211b of the magnetic sheet 210, a shear stress received by the operator does not change, and the operator does not perceive a feeling of unevenness. How the shear stress received by the operator from the magnetic sheet 220 changes is different depending on a direction in which the relative positional relationship between the surface 211 and the surface 221 is changed, which makes different a feeling of unevenness perceived by the operator.

FIGS. 4A and 4B illustrate examples of magnetic sheets 230 and 250 that are different from the magnetic sheet 210 in pitch, and FIGS. 4C and 4D illustrate examples of magnetic sheets 240 and 260 that are different from the magnetic sheet 220 in pitch. The magnetic sheets 230 and 250 are specific examples of the "first object", and the magnetic sheets 240 and 260 are specific examples of the "second object". Band-like regions 231a magnetized to the S-pole and band-like regions 231b magnetized to the N-pole are alternately and periodically disposed on one surface 231 (first surface) of the magnetic sheet 230. Similarly, band-like regions 241a magnetized to the S-pole and band-like regions 241b magnetized to the N-pole are alternately and periodically disposed on one surface 241 (second surface) of the magnetic sheet 240. Band-like regions 251a magnetized to the S-pole and band-like regions 251b magnetized to the N-pole are alternately and periodically disposed on one surface 251 (first surface) of the magnetic sheet 250. Similarly, band-like regions 261a magnetized to the S-pole and band-like regions 261b magnetized to the N-pole are alternately and periodically disposed on one surface 261 (second surface) of the magnetic sheet 260. In this example, the width in the short-side direction of the region 231a, the width in the short-side direction of the region 231b, the width in the short-side direction of the region 241a, and the width in the short-side direction of the region 241b are 4 mm. The width in the short-side direction of the region 251a, the width in the short-side direction of the region 251b, the width in the short-side direction of the region 261a, and the width in the short-side direction of the region 261b are 8 mm.

When the magnetic sheet 230 is used as the "first object" and the magnetic sheet 240 is used as the "second object", the magnetic sheets 210 and 220, the surfaces 211 and 221, the regions 211a, 211b, 221a, and 221b are replaced with the magnetic sheets 230 and 240, the surfaces 231 and 241, and the regions 231a, 231b, 241a, and 241b, respectively, and as with the case where the magnetic sheets 210 and 220 are used, the operator performs an operation of changing the relative positional relationship between the surface 231 and the surface 241 and/or an action of changing the relative positional relationship between the surface 231 and the surface 241 while bringing the surface 231 and the surface 241 into contact with or proximity to each other, thereby perceiving a feeling of unevenness (FIG. 5B). Similarly, when the magnetic sheet 250 is used as the "first object" and the magnetic sheet 260 is used as the "second object", the magnetic sheets 210 and 220, the surfaces 211 and 221, the regions 211a, 211b, 221a, and 221b are replaced with the magnetic sheets 250 and 260, the surfaces 251 and 261, and the regions 251a, 251b, 261a, and 261b, respectively, and as with the case where the magnetic sheets 210 and 220 are used, the operator performs an operation of changing the relative positional relationship between the surface 251 and the surface 261 and/or an action of changing the relative positional relationship between the surface 251 and the surface 261 while bringing the surface 251 and the surface 261 into contact with or proximity to each other, thereby perceiving a feeling of unevenness (FIG. 5C).

In addition, any of the magnetic sheets 210, 230, and 250 may be used as the "first object", any of the magnetic sheets 220, 240, and 260 may be used as the "second object", and the pitch of the "first object" may be different from the pitch of the "second object".

Figure 6C:
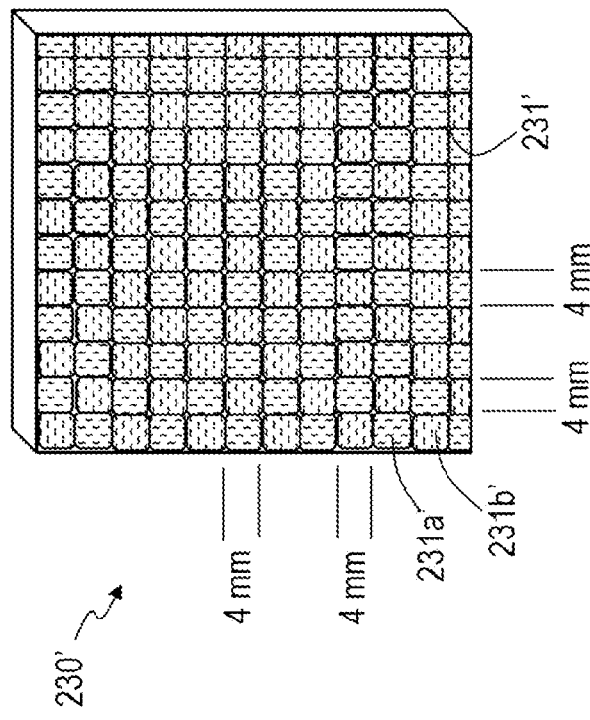
FIGS. 6A to 6D are diagrams illustrating examples of the magnetized magnetic sheets.
Figure 6D:
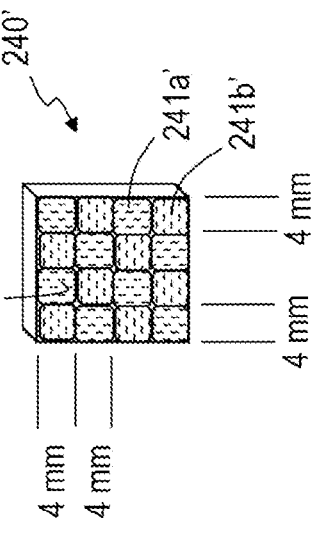
Figure 6A:
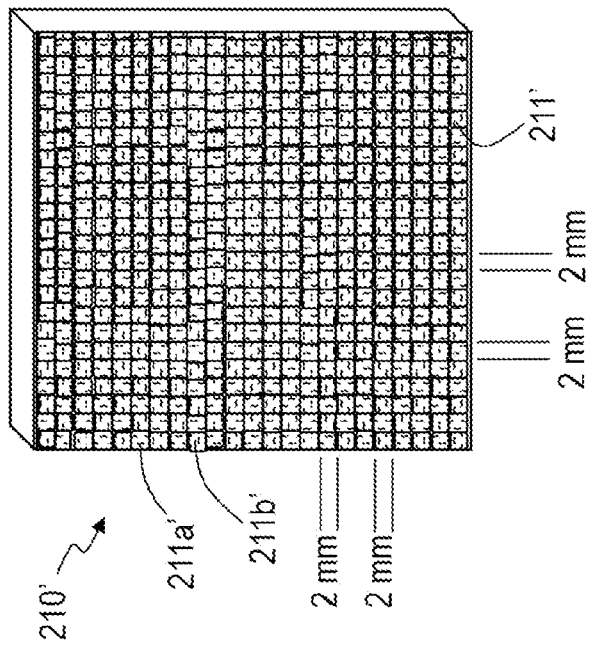
Figure 6B:
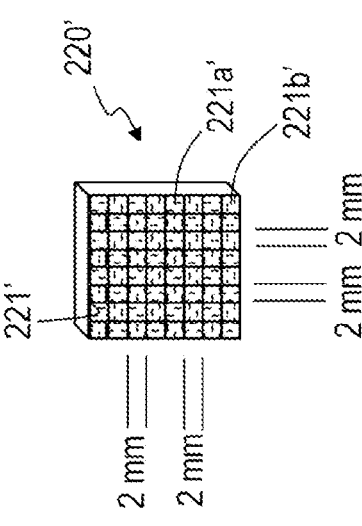
Figure 7B:
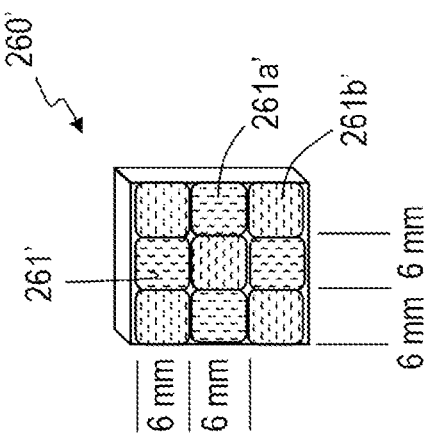
FIGS. 7A and 7B are diagrams illustrating examples of the magnetized magnetic sheets.
Figure 7A:
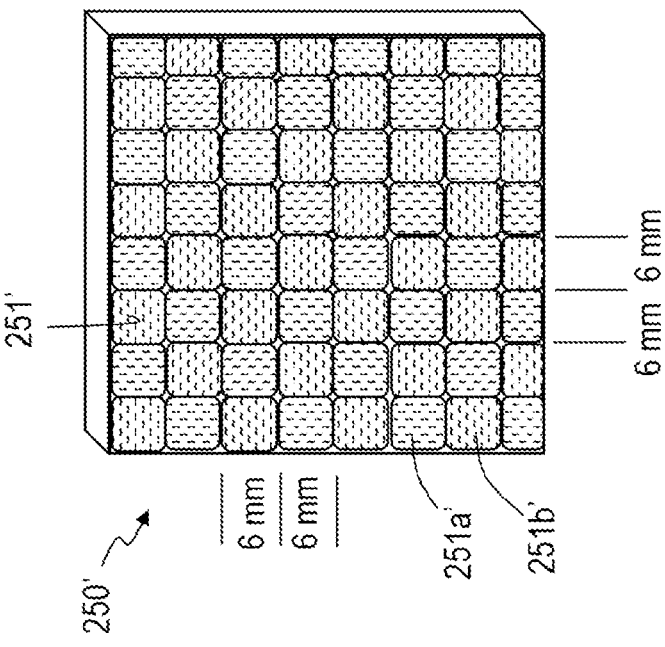

Other examples of the "first object" and the "second object" are described. FIGS. 6A to 6D and FIGS. 7A and 7B illustrate examples in which a texture including periodic substantially checkered regions magnetized to the S-pole and periodic substantially checkered regions magnetized to the N-pole is magnetized on a magnetic sheet, and this magnetic sheet is used as the "first object" and the "second object". The magnetic sheets 210', 230', and 250' in FIGS. 6A, 6C, and 7A are specific examples of the "first object", and the magnetic sheets 220', 240', and 260' in FIGS. 6B, 6D, and 7B are specific examples of the "second object". A substantially checkered pattern means a checkered pattern or a pattern similar to a checkered pattern. That is, examples of the substantially checkered pattern in the present embodiment include not only a pattern (checkered pattern) in which squares (or rectangles) magnetized to the S-pole and squares (or rectangles) magnetized to the N-pole are alternately and periodically disposed, but also include a pattern in which shapes similar to squares (or rectangles) magnetized to the S-pole and shapes similar to squares (or rectangles) magnetized to the N-pole are alternately and periodically disposed. Examples of the shape similar to a square (or rectangle) include a chamfered square (or rectangle), circle, and ellipse.

As illustrated in FIG. 6A, on one surface 211' (first surface) of the magnetic sheet 210' (first object), a substantially checkered texture (first texture) is magnetized in which chamfered square regions 211a' magnetized to the S-pole and chamfered square regions 211b' magnetized to the N-pole are alternately and periodically disposed. As illustrated in FIG. 6B, on one surface 221' (second surface) of the magnetic sheet 220' (second object), a substantially checkered texture (second texture) is magnetized in which chamfered square regions 221a' magnetized to the S-pole and chamfered square regions 221b' magnetized to the N-pole are alternately and periodically disposed. The pitch of the substantially checkered pattern magnetized on the magnetic sheets 210' and 220' (the width of each pattern alternately and periodically disposed) is 2 mm.

As illustrated in FIG. 6C, on one surface 231' (first surface) of the magnetic sheet 230' (first object), a substantially checkered texture (first texture) is magnetized in which chamfered square regions 231a' magnetized to the S-pole and chamfered square regions 231b' magnetized to the N-pole are alternately and periodically disposed. As illustrated in FIG. 6D, on one surface 241' (second surface) of the magnetic sheet 240' (second object), a substantially checkered texture (second texture) is magnetized in which chamfered square regions 241a' magnetized to the S-pole and chamfered square regions 241b' magnetized to the N-pole are alternately and periodically disposed. The pitch of the substantially checkered pattern magnetized on the magnetic sheets 230' and 240' is 4 mm.

As illustrated in FIG. 7A, on one surface 251' (first surface) of the magnetic sheet 250' (first object), a substantially checkered texture (first texture) is magnetized in which chamfered square regions 251a' magnetized to the S-pole and chamfered square regions 251b' magnetized to the N-pole are alternately and periodically disposed. As illustrated in FIG. 7B, on one surface 261' (second surface) of the magnetic sheet 260' (second object), a substantially checkered texture (second texture) is magnetized in which chamfered square regions 261a' magnetized to the S-pole and chamfered square regions 261b' magnetized to the N-pole are alternately and periodically disposed. The pitch of the substantially checkered pattern magnetized on the magnetic sheets 250' and 260' is 6 mm.

In a case where the substantially checkered texture as described above is magnetized on the magnetic sheet, and this magnetic sheet is used as the "first object" and the "second object", unevenness can be perceived by performing a following operation and/or a following action with a following state maintained. The following state is a state in which the operator brings the "first surface" of the "first object" and the "second surface" into contact with or proximity to each other. The following operation is an operation of changing the relative positional relationship between the "first surface" and the "second surface". The following action is an action of changing the relative positional relationship between the "first surface" and the "second surface". Note that the pitch of the "first object" may be the same as or different from the pitch of the "second object". In addition, a substantially checkered texture may be magnetized on a magnetic sheet, and this magnetic sheet may be used as the "first object". A texture in which the band-like regions described above are alternately disposed may be magnetized on a magnetic sheet, and this magnetic sheet may be used as the "second object". In contrast, a texture in which the band-like regions described above are alternately disposed may be magnetized on the magnetic sheet, and this magnetic sheet may be used as the "first object". A substantially checkered texture may be magnetized on the magnetic sheet, and the magnetic sheet may be used as the "second object".

Hereinafter, embodiments of the present invention will be described in detail with reference to the drawings.

First Embodiment

In the present embodiment, a "force sense presentation object" is described, in which the technique of Non Patent Literature 1 is combined with a touch panel and a feeling of unevenness is presented to an operator when information is input to the touch panel.

The "force sense presentation object" in the present embodiment includes a "first object" disposed on an input surface of a touch panel, and a "second object" worn, gripped, or supported by an operator ("action entity") that performs an input operation on a touch panel. The "first object" includes a "first surface", and a "first texture" including a region of the S-pole and a region of the N-pole is previously magnetized on the "first surface". The "second object" includes a "second surface", and a "second texture" including a region of the S-pole and a region of the N-pole is previously magnetized on the "second surface". The "first object" is, for example, a magnetic sheet disposed with one plate surface facing the input surface of the touch panel. The "first surface" is the other plate surface of the magnetic sheet. The "action entity" wears, grips, or supports the "second object" and performs a following operation and/or a following action while bringing the "first surface" and the "second surface" into contact with or proximity to each other, thereby performing an input operation to the touch panel and perceiving a feeling of unevenness. Here, the "action entity" performs an input operation to the touch panel in which the "first object" is disposed on the input surface. The following operation is an operation of changing the relative positional relationship between the "first surface" and the "second surface". The following action is an action of changing the relative positional relationship between the first surface and the second surface. In other words, the "action entity" performs an input operation to the touch panel by performing such an action and accordingly, a shear stress received by the "action entity" from the second object varies periodically, so that the action entity perceives a feeling of unevenness.

Hereinafter, a specific example of the present embodiment will be described with reference to the drawings.

Figure 8:
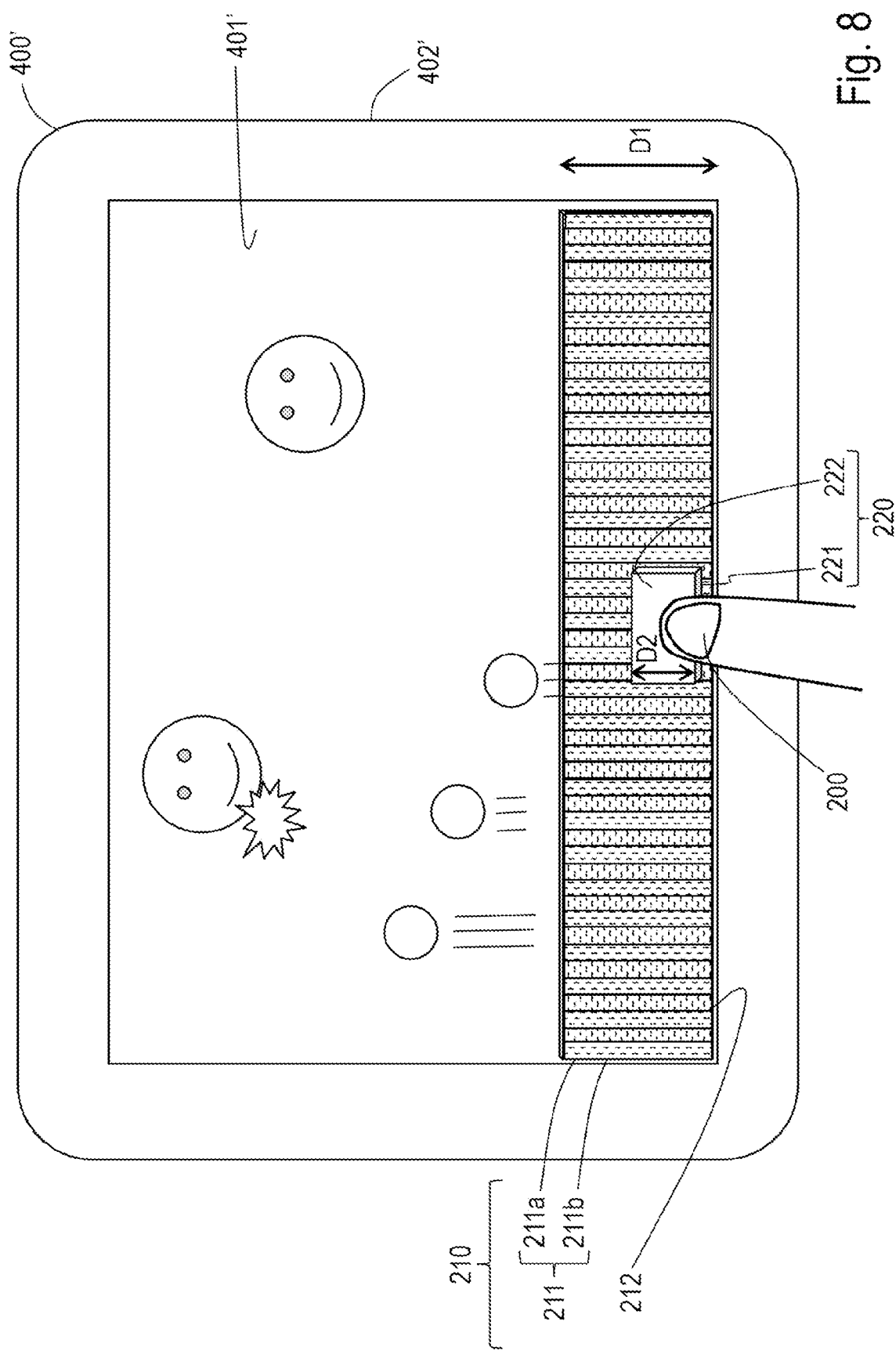
FIG. 8 is a diagram illustrating an example of an input device according to an embodiment.

FIG. 8 illustrates an example in which the technique of Non Patent Literature 1 is combined with the touch panel, and an input operation to contents such as a displayed game is performed on a touch panel, and a force sense is presented. As illustrated in FIG. 8, the magnetic sheet 210 described above is mounted at a lower portion of an input surface (front surface) of a touch panel 401' of an electronic device 400' such as a smart phone terminal device or a tablet terminal device. The plate surface 212 of the magnetic sheet 210 is disposed toward the input surface of the touch panel 401'. On the other plate surface 211 (first surface) of the magnetic sheet 210, the texture (first texture) including the regions 211a of the S-pole and the regions 211b of the N-pole is previously magnetized. The magnetic sheet 220 described above is disposed on the plate surface 211 of the magnetic sheet 210. On the surface 221 (second surface) of the magnetic sheet 220, the texture (second texture) including the regions 221a of the S-pole and the regions 221b of the N-pole is magnetized. The surface 221 faces the plate surface 211. The magnetic sheet 220 is disposed on the magnetic sheet 210 such that the long-side direction D1 of the regions 211a and 211b of the magnetic sheet 210 matches the long-side direction D2 of the regions 221a and 221b of the magnetic sheet 220. The operator performs an operation of changing the relative positional relationship between the surface 211 and the surface 221 while touching, with the finger 200, the other surface 222 of the magnetic sheet 220 disposed on the magnetic sheet 210 and bringing the surface 211 and the surface 221 into contact with or proximity to (substantially contact with) each other. As a result, the input operation to the contents such as a game or the like displayed on the touch panel 401' is performed, and the operator perceives a feeling of unevenness. In response to the input operation, the electronic device 400' is controlled to change the contents such as a game or the like displayed on the touch panel 401' (output device) or change a sound output from a speaker 402' (output device) of the electronic device 400'.

FEATURES OF THE PRESENT EMBODIMENT

In the present embodiment, when inputting information to the input device, the operator who inputs information can perceive a feeling of unevenness.

Modification Example 1 of First Embodiment

In the first embodiment, a plurality of the "second objects" may be utilized such that a combination of information input to the touch panel and a feeling of unevenness presented to the operator may be different for each "second object". This example is defined as a modification example 1 of the first embodiment, and only differences from the first embodiment will be described.

Figure 9:
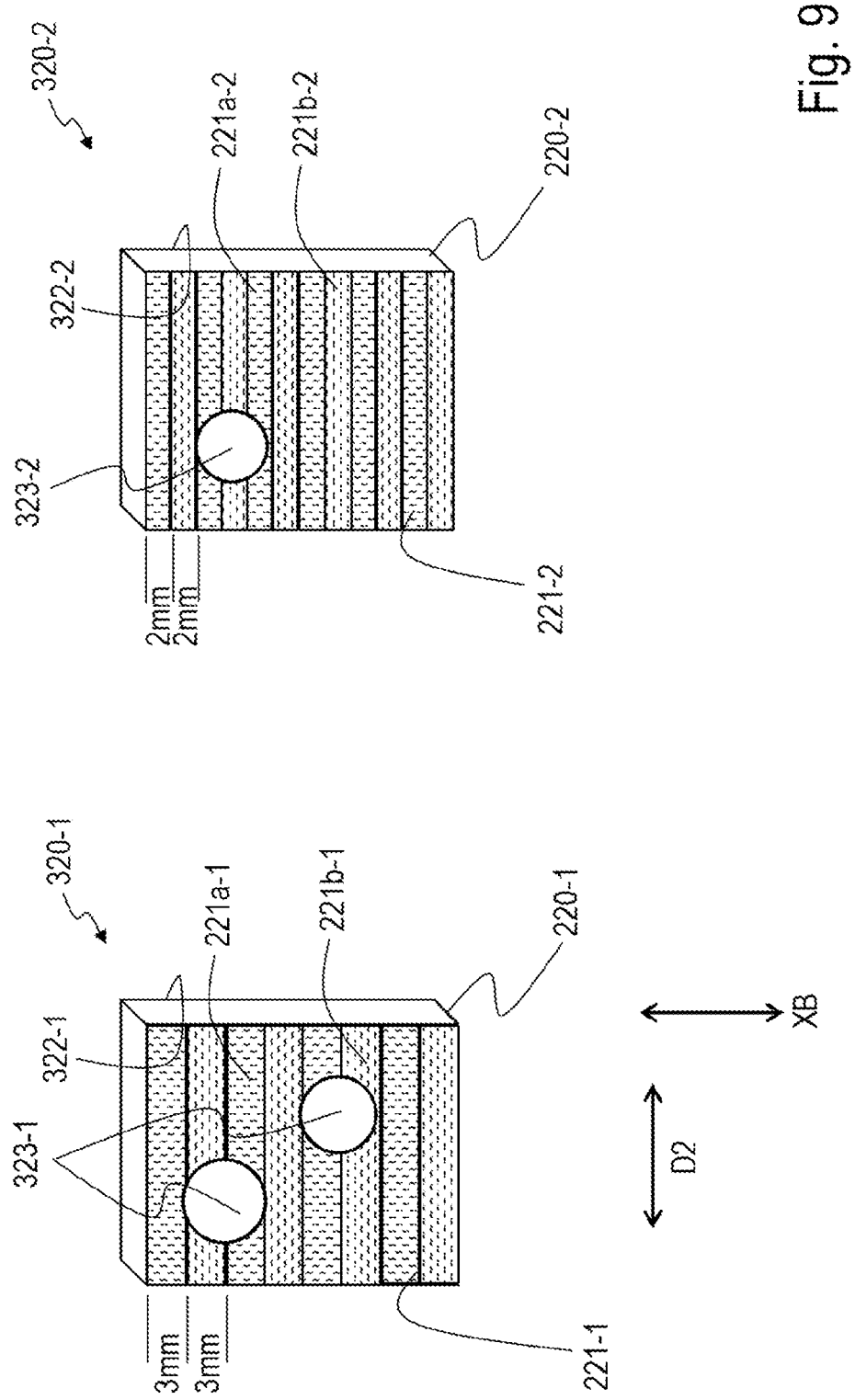
FIG. 9 is a diagram illustrating examples of second objects.

FIG. 9 and FIG. 10 illustrate examples of the "second objects" in the present modification example. The "force sense presentation object" in the present modification example includes $M_2$ number of "second objects". Here, $m_2=1, \ldots, M_2$, and $M_2$ is an integer of two or more. In the present modification example, $M_2$ is two.

Each "second object" 320-$m_2$ includes a magnetic sheet 220-$m_2$ and a conductive portion 323-$m_2$ on one surface 221-$m_2$. On the surface 221-$m_2$ (second surface) of the magnetic sheet 220-$m_2$, a texture (second texture) including regions 221a-$m_2$ of the S-pole and regions 221b-$m_2$ of the N-pole is magnetized. The "second object" 320-$m_2$ is disposed such that the surface 221-$m_2$ faces the plate surface 211, that is, such that the surface 221-$m_2$ of the magnetic sheet 220-$m_2$ and the conductive portion 323-$m_2$ face the plate surface 211.

In the example in FIG. 9, the band-like regions 221a-$m_2$ and 221b-$m_2$ extending in a direction D2 are alternately and periodically disposed in a direction XB substantially perpendicular to the direction D2 on the surface 221-$m_2$ of the magnetic sheet 220-$m_2$ of the "second object" 320-$m_2$. Here, the magnetization patterns of the textures (second textures) of the magnetic sheets 220-1, ..., $M_2$ of the "second object" 320-1, ..., $M_2$ are different from each other. In the example in FIG. 9, both the width in the short-side direction (direction XB) of the region 221a-1 and the width in the short-side direction of the region 221b-1 are 3 mm, and both the width in the short-side direction of the region 221a-2 and the width in the short-side direction of the region 221b-2 are 2 mm.

The conductive patterns of the conductive portions 323-1, ..., $M_2$ of the "second objects" 320-1, ..., $M_2$ are different from each other. For example, one or more conductors are disposed in the conductive portions 323-1, ..., $M_2$ of the "second objects" 320-1, ..., $M_2$ such that the conductive patterns differ from each other. In the example in FIG. 9, the conductive pattern of the conductive portions 323-1 includes two circular conductors having a diameter of 6 mm, and the conductive pattern of the conductive portion 323-2 includes a single circular conductor having a diameter of 6 mm.

The width in the short-side direction of the regions 211a and the width in the short-side direction of the regions 211b of the plate surface 211 of the magnetic sheet 210 in the present modification example are 2 mm.

The other surface 322-$m_2$ of each "second object" 320-$m_2$ may be provided with nothing, any indication or mark capable of distinguishing each "second object", any indication or mark capable of distinguishing the direction D2 and the direction XB, or a knob for the operator's operation. FIG. 10 illustrates an example in which a knob 324-$m_2$ is provided on the surface 322-$m_2$ of the "second object" 320-$m_2$ in the example in FIG. 9. The knob 324-$m_2$ is a solid body that can be held by the operator with a plurality of fingers, and function as a mark capable of distinguishing the direction D2 and the direction XB. Furthermore, the knob 324-1 and the knob 324-2 have different sizes so as to function as marks capable of distinguishing the respective "second objects".

The operator performs an operation of changing the relative positional relationship between the surface 221-$m_2$ and the conductive portion 323-$m_2$, and the plate surface 211 while touching, with the finger 200, any of the "second objects" 320-$m_2$ disposed on the magnetic sheet 210, and bringing the surface 221-$m_2$ and the conductive portion 323-$m_2$ into contact with or proximity to (substantially in contact with) the plate surface 211. For example, the operator performs the operation while touching, with the finger 200, a portion of the "second object" 320-$m_2$ that does not face the plate surface 211, for example, the surface 322-$m_2$ of the "second object" 320-$m_2$. For example, when the "second object" 320-$m_2$ is provided with the knob 324-$m_2$, the operator may touch the knob 324-$m_2$ with the finger 200 to perform the operation.

The electronic device 400' detects the position and the conductive pattern of the conductive portion 323-$m_2$ that is in contact with or proximity to the touch panel 401', and inputs the detected position and information previously determined for each conductive pattern to contents such as a game or the like displayed on the touch panel 401'. For example, in the case of game contents in which a bullet is fired at the finger's position of the operator of the touch panel 401', when detecting that the "second object" 320-2 is in contact with or proximity to the touch panel 401', the electronic device 400' controls the game contents so as to fire a larger bullet as compared to the case of using the "second object" 320-1. This allows the operator to perform the input operation to the game contents so as to fire a larger bullet while perceiving a greater feeling of unevenness when using the "second object" 320-2 than when using the "second object" 320-1.

Modification Example 2 of First Embodiment

Although a plurality of the "second objects" are used in the modification example 1 of the first embodiment, the orientation of one "second object" can be changed so as to make different a combination of information input to the touch panel and a feeling of unevenness presented to the operator depending on the orientation of the "second object". This example is defined as a modification example 2 of the first embodiment and only differences from the first embodiment will be described.

Figure 11:
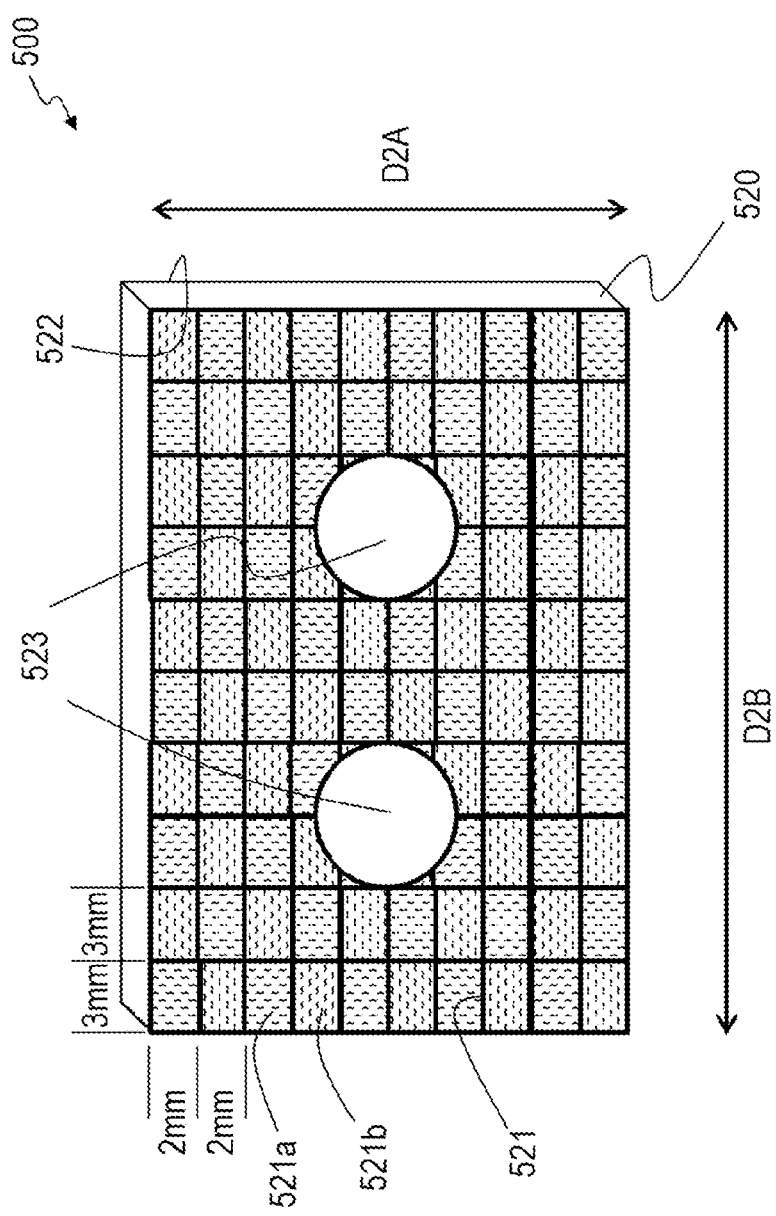
FIG. 11 is a diagram illustrating an example of the second object.

FIG. 11 illustrates an example of the "second object" in the present modification example. A "second object" 500 includes a magnetic sheet 520 and conductive portions 523 on one surface 521. On the surface 521 of the magnetic sheet 520, a texture (second texture) including regions 521a of the S-pole and regions 521b of the N-pole is magnetized. The "second object" 520 is disposed such that the surface 521 faces the plate surface 211, that is, such that the surface 521 of the magnetic sheet 520 and the conductive portions 523 face the plate surface 211.

In the example in FIG. 11, rectangular regions magnetized to the S-pole and rectangular regions magnetized to the N-pole are alternately and periodically disposed on the surface 521 of the magnetic sheet 520 of the "second object" 500. Here, the magnetization width in the direction D2A and the magnetization width in the direction D2B of the magnetic sheet 520 of the "second object" 500 are different from each other. In this example, in each rectangular region, the short side (width in the direction D2A) has a width of 2 mm, and the long side (width in the direction D2B) has a width of 3 mm.

The conductive pattern in the direction D2A and the conductive pattern in the direction D2B of the conductive portions 523 of the "second object" 500 are different from each other. For example, a plurality of conductors are disposed in the conductive portions 523 of the "second object" 500 such that the conductive pattern in the direction D2A and the conductive pattern in the direction D2B are different from each other. In the example illustrated in FIG. 11, two circular conductors having a diameter of 6 mm are disposed in the conductive portions 523 in the direction D2B with a spacing of 12 mm between the centers.

The width in the short-side direction of the regions 211a and the width in the short-side direction of the regions 211b of the plate surface 211 of the magnetic sheet 210 in the present modification example are 2 mm.

The other surface 522 of the "second object" 500 may be provided with nothing, any indication or mark capable of distinguishing the direction D2A and the direction D2B, or a knob for the operator's operation.

The operator performs an operation of changing the relative positional relationship between the surface 521 and the conductive portion 523, and the plate surface 211 while touching, with the finger 200, the other surface 522 of the "second object" 500 disposed on the magnetic sheet 210 with a state in which the surface 521 and the conductive portions 523 are brought into contact with or proximity to (substantially contact with) the plate surface 211 such that the direction D2A matches the direction D1 or the direction D2B matches the direction D1. For example, the operator performs the operation while touching, with the finger 200, the surface 522 or the like of the "second object" 500, that is, a portion of the "second object" 5000 that does not face the plate surface 211. For example, when the "second object" 500 is provided with a knob, the operator may touch the knob with the finger 200 to perform the operation.

The electronic device 400' detects the positions of the conductive portions 523 that are in contact with or proximity to the touch panel 401' and the orientation of the conductive pattern, and inputs information previously determined for each detected position and each detected orientation of the conductive patterns to contents such as a game or the like displayed on the touch panel 401'. For example, in the case of game contents in which a bullet is fired at the finger's position of the operator of the touch panel 401', the electronic device 400' controls the game contents so as to fire a larger bullet in a following first case than in a following second case. The following first case is a case in which the "second object" 500 is detected to be in contact with or proximity to the touch panel 401' such that the direction D2B matches the direction D1. In addition, the following second case is a case in which the "second object" 500 is detected to be in contact with or proximity to the touch panel 401' such that the direction D2A matches the direction D1. In this manner, the operator can perform the input operation to the game contents so as to fire a larger bullet while perceiving a greater feeling of unevenness when using the "second object" 500 such that the direction D2B matches the direction D1 than when using the "second object" 500 such that the direction D2A matches the direction D1.

Modification Example 3 of First Embodiment

As a modification example 3 of the first embodiment, another example is defined in which the orientation of one "second object" can be changed so as to make different a combination of information input to the touch panel and a feeling of unevenness presented to the operator depending on the orientation of the "second object", and differences from the first embodiment will be described below.

FIGS. 12A to 12C illustrate examples of a magnetic sheet 610 in the present modification example, which is mounted at a lower portion of the input surface (front surface) of the touch panel 401' of the electronic device 400' such as a smartphone terminal device or a tablet terminal device, and a "second object" 600 in the present modification example, which is disposed on the magnetic sheet 610 in the present modification example.

The magnetic sheet 610 is disposed such that one plate surface 612 of the magnetic sheet 610 faces the input surface of the touch panel 401', such that an arrow direction D1B of the magnetic sheet 610 substantially matches the right direction of the input surface of the touch panel 401', and such that an arrow direction D1A of the magnetic sheet 610 substantially matches the upward direction of the input surface of the touch panel 401' when viewed from the operator.

On the other plate surface 611 (first surface) of the magnetic sheet 610, a texture (first texture) including regions 611a of the S-pole and regions 611b of the N-pole is previously magnetized. In the example in FIG. 12A, the regions 611a of the S-pole and the regions 611b of the N-pole each have a V-shape symmetric with respect to a straight line in the direction D1B located at the center of the width of the plate surface 611 in the direction D1A. The regions 611a and the regions 611b are periodically and alternately disposed. Of the regions 611a of the S-pole and the regions 611b of the N-pole, portions on the side of the arrow direction D1A from the center of the width in the direction D1A are referred to as partial regions 611a1 of the S-pole and partial regions 611b1 of the N-pole, and portions on the side of the direction opposite to the arrow direction D1A from the center of the width in the direction D1A are referred to as partial regions 611a2 of the S-pole and partial regions 611b2 of the N-pole. The partial regions 611a1 of the S-pole and the partial regions 611b1 of the N-pole each are a parallelogram having a short side in the direction D1B, a long side tilted at −45 degrees relative to the arrow direction D1B, and a short-side width (width in direction D1B) of 4 mm. The partial regions 611a2 of the S-pole and the partial regions 611b2 of the N-pole each are a parallelogram having a short side in the direction D1B, a long side at 45 degrees relative to the arrow direction D1B, and a short-side width (width in direction D1B) of 4 mm.

The "second object" 600 includes a magnetic sheet 620 and conductive portions 623 on one surface 621. The "second object" 600 is disposed such that the surface 621 faces the plate surface 611, such that the arrow direction D2B of the "second object" 600 substantially matches the right direction of the input surface of the touch panel 401', and such that the arrow direction D2A of the "second object" 600 substantially matches the upward direction of the input surface of the touch panel 401' when viewed from the operator. That is, the "second object" 600 is disposed such that all of following three conditions are satisfied. The first condition is that the surface 621 and the conductive portions 623 of the magnetic sheet 620 of the "second object" 600 faces the plate surface 611. The second condition is that the arrow direction D2B of the "second object" 600 substantially matches the arrow direction D1B of the magnetic sheet 610 mounted on the input surface of the touch panel 401'. The third condition is that the arrow direction D2A of the "second object" 600 substantially matches the arrow direction D1A of the magnetic sheet 610 mounted on the input surface of the touch panel 401'.

On the surface 621 of the magnetic sheet 620 of the "second object" 600, a texture (second texture) including regions 621a of the S-pole and regions 621b of the N-pole is previously magnetized. In the example in FIG. 12B, the regions 621a of the S-pole and the regions 621b of the N-pole each have a V-shape symmetric with respect to a straight line in the direction D2B located at the center of the width of the plate surface 621 in the direction D2A. The regions 621a and the regions 621b are alternately and periodically disposed in the direction D2B. Of the regions 621a of the S-pole and the regions 621b of the N-pole, portions on the side of the arrow direction D2A from the center of the width in the direction D2A are referred to as partial regions 621a1 of the S-pole and partial regions 621b1 of the N-pole, and portions on the side of the direction opposite to the arrow direction D2A from the center of the width in the direction D2A are referred to as partial regions 621a2 of the S-pole and partial regions 621b2 of the N-pole. The partial regions 621a1 of the S-pole and the partial regions 621b1 of the N-pole each are a parallelogram having a short side in the direction D2B, a long side at −45 degrees relative to the arrow direction D2B, and a short-side width (width in direction D2B) of 4 mm. The partial regions 621a2 of the S-pole and the partial regions 621b2 of the N-pole each are a parallelogram having a short side in the direction D2B, a long side at 45 degrees relative to the arrow direction D2B, and a short-side width (width in direction D2B) of 4 mm.

As in the example in FIG. 12B, conductors are disposed in the conductive portions 623 of the "second object" 600 such that the conductive pattern is different between when viewed from the arrow direction D2A, when viewed from the opposite direction to the arrow direction D2A, when viewed from the arrow direction D2B, and when viewed from the opposite direction to the arrow direction D2B. In the example in FIG. 12, three circular conductors having a diameter of 6 mm are disposed in the conductive portions 623 located at vertices of an isosceles triangle that is not an equilateral triangle.

The other surface 622 of the "second object" 600 may be provided with nothing, any indication or mark capable of distinguishing the direction D2A and the direction D2B, or a knob for the operator's operation. In the case of providing the knob, like a knob 624 in the example in FIG. 12C, the knob is preferably a solid body that can be held by the operator with a plurality of fingers and enable the arrow direction D2A to be distinguished.

The operator performs an operation of changing the relative positional relationship between the surface 621 and the conductive portion 623, and the plate surface 611 while touching the knob 624 of the "second object" 600 with the finger 200 and bringing the surface 621 and the conductive portions 623 into contact with or proximity to (substantially contact with) the plate surface 611. At this time, the operator operates the "second object" 600 by either matching the arrow method D2A with the arrow direction D1A, matching the arrow direction D2A with the opposite direction to the arrow direction D1A, matching the arrow method D2A with the arrow direction D1B, or matching the arrow direction D2A with the opposite direction to the arrow direction D1B.

The electronic device 400' detects the positions of the conductive portions 623 that are in contact with or proximity to the touch panel 401' and the orientation of the conductive pattern, and inputs the detected position and information previously determined for each detected orientation of the conductive pattern to contents such as a game or the like displayed on the touch panel 401'. For example, in the case of game contents in which a bullet is fired at the finger's position of the operator of the touch panel 401', when detecting that the "second object" 600 is in contact with or proximity to the touch panel 401' such that the arrow direction D2A matches the arrow direction D1A, the electronic device 400' controls the game contents so as to fire a larger bullet as compared to the other cases. In this manner, the operator can perform the input operation to the game contents so as to fire a larger bullet while perceiving a greater feeling of unevenness when using the "second object" 600 such that the direction D2A matches the direction D1A than in the other cases.

Second Embodiment

As in the first embodiment, in the present embodiment as well, the technique of Non Patent Literature 1 is applied to an input interface of a touch panel, and a feeling of unevenness is presented to an operator when information is input to the touch panel. In particular, in the present embodiment, various operational feelings are presented to the operator by changing a combination of a "first object" disposed on an input surface of the touch panel and a "second object" worn, gripped, or supported by the operator.

A "force sense presentation object" in the present embodiment includes the "first object" disposed on the input surface of the touch panel and a plurality of the "second objects" worn, gripped, or supported by an "action entity" that performs an input operation to the touch panel. The "first object" includes a "first surface", and a "first texture" including regions of the S-pole and regions of the N-pole is previously magnetized on the "first surface". The "second object" includes a "second surface", and a "second texture" including regions of the S-pole and regions of the N-pole is previously magnetized on the "second surface". Each "second object" has a different magnetization pattern of the "second texture". That is, the magnetization patterns of the plurality of the "second objects" are different from each other.

The "action entity" wears, grips, or supports a "selected object" selected from the plurality of the "second objects" to perform a following operation and/or a following action with a following state maintained. Here, the following state is a state in which the "first surface" of the "first object" disposed on the input surface and the "second surface" of the "selected object" are in contact with or proximity to each other. The following operation is an operation of changing the relative positional relationship between the "first surface" and the "second surface" of the "selected object". The following action is an action of changing the relative positional relationship between the "first surface" and the "second surface" of the "selected object". In this manner, an input operation to the touch panel is performed and accordingly, a shear stress received by the "action entity" from the "selected object" varies periodically, so that the "action entity" perceives a feeling of unevenness. The maximum value of the shear stress and/or the period of the shear stress and the feeling of unevenness are different for each "selected object".

Hereinafter, a specific example of the present embodiment will be described with reference to the drawings.
<Slider-Type>

Figure 13A:
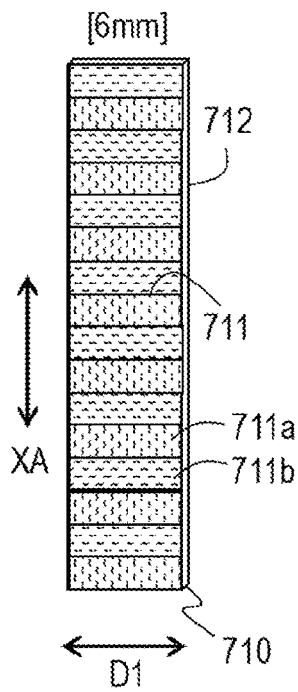
FIGS. 13A and 13B are diagrams illustrating examples of the magnetized magnetic sheets.
Figure 13B:
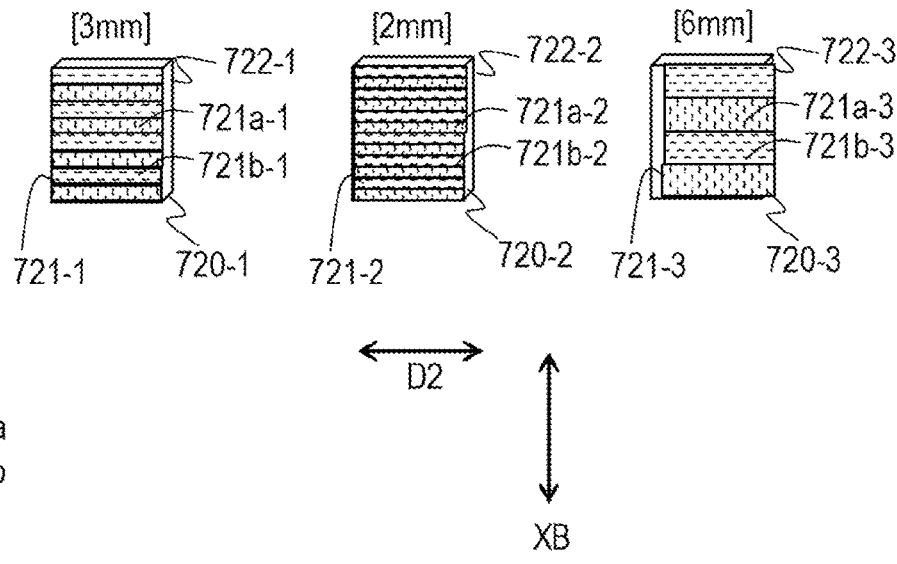

FIGS. 13A and 13B illustrate examples of a slider-type "force sense presentation object" in the present embodiment. For example, the slider-type "force sense presentation object" is an input interface that allows the operator to manipulate the volume of a sound output from a speaker, the brightness of illumination, and the like by an operation of sliding a slider (moving in a predetermined axial direction), for example, it is an input interface used by the operator, for example, to set a parameter value that can be freely set in a range between a predetermined minimum value and a predetermined maximum value to a desired value.

The "force sense presentation object" in the present embodiment includes a single magnetic sheet 710 (first object) and $M_2$ number of magnetic sheets 720-$m_2$ (second objects). Here, $m_2$=1, . . . , $M_2$, and $M_2$ is an integer of two or more. The present embodiment shows an example where $M_2$ is three.

On one surface 711 (first surface) of the magnetic sheet 710, a texture (first texture) including regions 711a of the S-pole and regions 711b of the N-pole is magnetized. In the surface 711 in the present embodiment, the band-like regions 711a magnetized to the S-pole and the band-like regions 711b magnetized to the N-pole are alternately and periodically disposed. In the example in FIG. 13A, the band-like regions 711a and 711b extending in the direction D1 are alternately and repeatedly disposed in a direction XA substantially perpendicular to the direction D1. In this example, the width in the short-side direction of the regions 711a (direction XA) and the width in the short-side direction of the regions 711b are 6 mm.

On one surface 721-$m_2$ (second surface) of each of the plurality of magnetic sheets 720-$m_2$, a texture (second texture) including regions 721a-$m_2$ of the S-pole and regions 721b-$m_2$ of the N-pole is magnetized. The band-like regions 721a-$m_2$ magnetized to the S-pole and the band-like regions 721b-$m_2$ magnetized to the N-pole are alternately and periodically disposed on the surface 721-$m_2$ in the present embodiment. In the example in FIG. 13B, the band-like regions 721a-$m_2$ and 721b-$m_2$ extending in the direction D2 are alternately and repeatedly disposed in a direction XB substantially perpendicular to the direction D2. The magnetic sheets 720-1, . . . , $M_2$ each have a different magnetization pattern of the texture. In this example, both the width in the short-side direction (direction XB) of the regions 721a-1 and the width in the short-side direction of the regions 721b-1 are 3 mm, both the width in the short-side direction of the region 721a-2 and the width in the short-side direction of the region 721b-1 are 2 mm, and both the width in the short-side direction of the region 721a-1 and the width in the short-side direction of the region 721b-1 are 6 mm.

Figure 15:
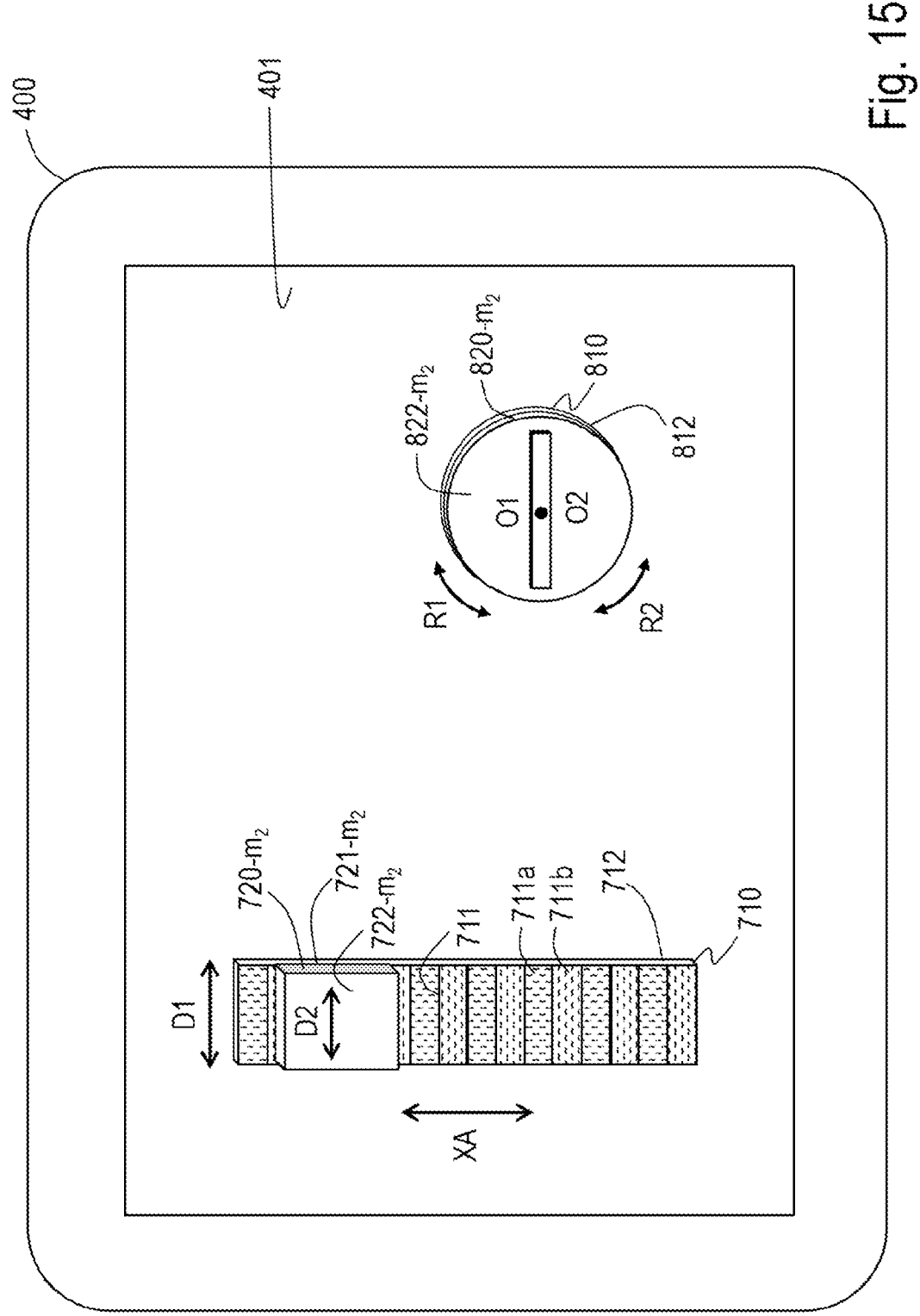
FIG. 15 is a diagram illustrating an example of the input device.

As illustrated in FIG. 15, the magnetic sheet 710, which is the "first object", is mounted on the input surface of the touch panel 401 of the electronic device 400. Here, the other surface 712 of the magnetic sheet 710 (the opposite surface to the surface 711) is disposed to face the input surface of the touch panel 401. For example, in the case where any position of the touch panel 401 of the electronic device 400 is predetermined to be a region for receiving a slide input operation (input by a sliding operation) (in the case where any position is predetermined by software or the like implemented in the electronic device 400), for example, the electronic device 400 displays the region on the touch panel 401, so that the operator disposes the surface 712 of the magnetic sheet 710 in the region. Alternatively, the electronic device 400 may detect in which region of the touch panel 401 the magnetic sheet 710 is mounted, and accept the slide input operation in the detected region. In this case, the surface 712 of the magnetic sheet 710 may be disposed in any region of the touch panel 401 which can accept the slide input operation. The operator may also designate in which region of the touch panel 401 the slide input operation is accepted (for example, the operator inputs information for designating this region to the touch panel 401). In this case, the electronic device 400 detects which region of the touch panel 401 has been designated, and the operator disposes the surface 712 of the magnetic sheet 710 in the region designated by the input.

In an example of the input interface used by the operator to set, to a desired value, a parameter value of the electronic device 400, which can be freely set in a range between a predetermined minimum value and a predetermined maximum value, the minimum value and the maximum value may be assigned as follows. Assigning as follows means that in a case where the region accepting the slide input operation of the touch panel 401 is vertically disposed, for example, a lower end of the region accepting the slide input operation is assigned to the minimum value, and the upper end of the region accepting the slide input operation is assigned to the maximum value. Here, the case where the region accepting the slide input operation of the touch panel 401 is vertically disposed means that the direction XA of the magnetic sheet 710 matches the vertical direction of the touch panel 401. In addition, in the case where the region accepting the slide input operation on the touch panel 401 is vertically disposed, that is, the direction XA of the magnetic sheet 710 matches the lateral direction of the touch panel 401, for example, a left end of the region accepting the slide input operation may be assigned to the minimum value, and a right end of the region accepting the slide input operation may be assigned to the maximum value.

The operator selects any magnetic sheet 720-$m_2$, and disposes the selected magnetic sheet 720-$m_2$ (selected object) such that a surface 722-$m_2$ of the magnetic sheet 720-$m_2$ faces outward, and a surface 721-$m_2$ of the magnetic sheet 720-$m_2$ is in contact with the surface 711 of the magnetic sheet 710. The magnetic sheet 720-$m_2$ is disposed on the magnetic sheet 710 such that the long-side direction D1 of the regions 711a and 711b of the magnetic sheet 710 matches the long-side direction D2 of the region 721a-$m_2$ and 721b-$m_2$ of the magnetic sheet 720-$m_2$.

Figure 13C:
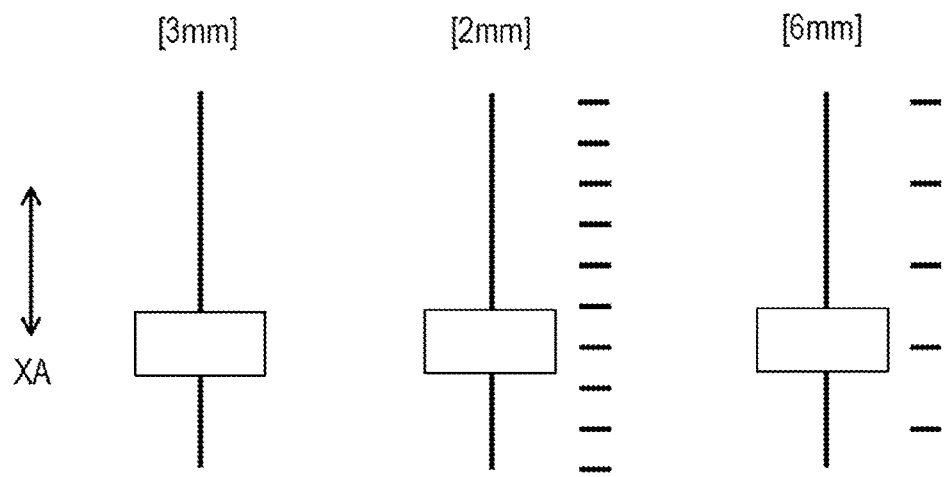
FIG. 13C is a conceptual drawing illustrating examples of a feeling of unevenness.

The operator performs an operation of changing the relative positional relationship between the surface 711 and the surface 721-$m_2$ while touching, with a finger, the surface $722$-$m_2$ of the magnetic sheet $720$-$m_2$ disposed on the magnetic sheet $710$ and bringing the surface $711$ and the surface $721$-$m_2$ into contact with or proximity to each other. In the example in FIG. 15, the relative positional relationship between the surface $711$ and the surface $721$-$m_2$ is changed (slid) in the direction XA, which is the short-side direction of the regions $711a$ and $711b$ of the magnetic sheet $720$-$m_2$. As a result, an input operation (slide input operation) to the touch panel $401$ is performed, and a shear stress in the XA direction received by the operator from the magnetic sheet $720$-$m_2$ changes periodically. Thus, the operator perceives a feeling of unevenness in a direction substantially orthogonal to the surface $721$-$m_2$. As described above, each magnetic sheet $720$-$m_2$ has a different magnetization pattern of the regions $721a$-$m_2$ and $721b$-$m_2$. Therefore, the maximum value of the shear stress and/or the period of the shear stress received by the operator from the magnetic sheet $720$-$m_2$ are different depending on a combination of the magnetic sheet $710$ and the selected magnetic sheet $720$-$m_2$, which makes different a feeling of unevenness perceived by the operator. In other words, even when the same magnetic sheet $710$ is used, the operator perceives a different feeling of unevenness according to the selected magnetic sheet $720$-$m_2$. That is, the operator can perceive a different feeling of touch merely by changing the magnetic sheet $720$-$m_2$. For example, as illustrated in FIG. 13C, when selecting the magnetic sheet $720$-$1$ and performing a slide input operation to the touch panel $401$, the operator can smoothly perform the slide input operation without perceiving a feeling of unevenness, that is, a feeling of clicking. When selecting the magnetic sheet $720$-$2$, the operator can also perform the same slide input operation while perceiving a feeling of unevenness at small intervals (for example, a feeling of unevenness in W stages (W is a positive integer)), that is, a feeling of clicking in W stages. When selecting the magnetic sheet $720$-$3$, the operator can also perform the same slide input operation while perceiving a feeling of unevenness at large intervals (for example, a feeling of unevenness in W' stages (W' is a largest integer of W/2 or less)), that is, a feeling of clicking in W' stages.

<Dial-Type>

Figures 14A, 14B:
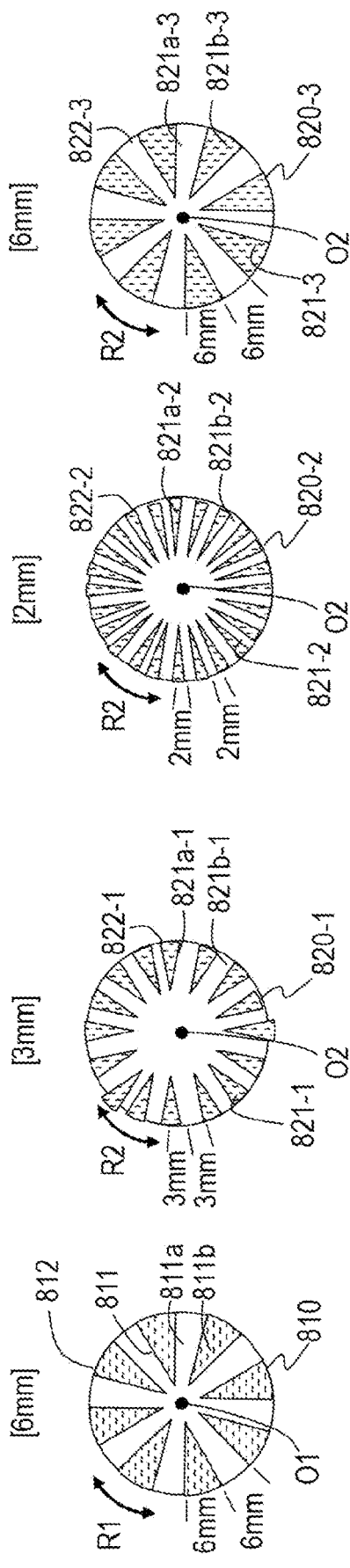
FIGS. 14A and 14B are diagrams illustrating examples of a magnetized dial-type magnetic sheet.

FIGS. 14A and 14B illustrate a dial-type "force sense presentation object" in the present embodiment. The dial-type "force sense presentation object" is, for example, an input interface used by the operator to simultaneously control sound volumes output from a plurality of speakers disposed around the operator by rotation of a dial, thereby operating the incoming direction of a sound to the operator. In addition, the dial-type "force sense presentation object" is, for example, an input interface used by the operator to control the position of a light fixture disposed on a ceiling by rotation of a dial, thereby operating the incoming direction of light to the operator. In addition, the dial-type "force sense presentation object" is, for example, an input interface used by the operator to control the orientation of a machine by rotation of a dial. That is, the dial-type "force sense presentation object" is an input interface used by the operator, for example, to set a parameter value that can be freely set to a desired value.

The "force sense presentation object" in the present embodiment includes a single magnetic sheet $810$ (first object) and $M_2$ number of magnetic sheets $720$-$m_2$ (second objects). Here, $m_2=1, \ldots, M_2$, and $M_2$ is an integer of two or more. The present embodiment shows an example where $M_2$ is three.

The magnetic sheet $810$ is substantially disk-shaped. On one surface $811$ (first surface) of the magnetic sheet $810$, a texture (first texture) including regions $811a$ of the S-pole and regions $811b$ of the N-pole is magnetized. In the surface $811$ in the present embodiment, the regions $811a$ magnetized to the S-pole and the regions $811b$ magnetized to the N-pole are alternately and periodically disposed. In the example in FIG. 14A, the regions $811a$ and $811b$ are repeatedly disposed along a circumferential direction R1 around a center axis O1 of the magnetic sheet $810$ (an axis substantially perpendicular to the surface $811$). For example, of the outer periphery of the magnetic sheet $810$, both the length of an arc corresponding to each of the regions $811a$ and the length of an arc corresponding to each of the regions $811b$ are 6 mm. Ideally, the region $811a$ of the S-pole and the region $811b$ of the N-pole provided on the surface $811$ each are a fan-shaped region centered around the central axis O1. When all of the regions $811b$ of the N-pole are magnetized using a cylindrical magnet with a predetermined diameter (for example, 2 mm) and then, all of the regions $811a$ of the S-pole are magnetized by the magnet with its magnet pole inverted, a texture as illustrated in FIG. 14A is formed. However, even the regions $811a$ of the S-pole and the regions $811b$ of the N-pole that are not completely fan-shaped as in FIG. 14A are sufficient to present a desired feeling of unevenness.

The magnetic sheet $820$-$m_2$ is also substantially disc-shaped. The diameter of the magnetic sheet $820$-$m_2$ is substantially the same as the diameter of the magnetic sheet $810$, for example. On one surface $821$-$m_2$ (second surface) of each of plurality of the magnetic sheets $820$-$m_2$, a texture (second texture) including regions $821a$-$m_2$ of the S-pole and regions $821b$-$m_2$ of the N-pole is magnetized. On the surface $821$-$m_2$ in the present embodiment, the regions $821a$-$m_2$ magnetized to the S-pole and the regions $821b$-$m_2$ magnetized to the N-pole are alternately and periodically disposed. In the example in FIG. 14B, the regions $821a$-$m_2$ and $821b$-$m_2$ are repeatedly disposed along a circumferential direction R2 around a center axis O2 of the magnetic sheet $820$-$m_2$ (an axis substantially perpendicular to the surface $821$-$m_2$). The magnetic sheets $820$-$1, \ldots, M_2$ each have a different magnetization pattern of the texture. For example, of the outer periphery of the magnetic sheet $820$-$1$, both the length of an arc corresponding to each of the regions $821a$-$1$ and the length of an arc corresponding to each of the regions $821b$-$1$ are 3 mm. Of the outer periphery of the magnetic sheet $820$-$2$, both the length of an arc corresponding to each of the regions $821a$-$2$ and the length of an arc corresponding to each of the regions $821b$-$2$ are 2 mm. Of the outer periphery of the magnetic sheet $820$-$3$, both the length of an arc corresponding to each of the regions $821a$-$3$ and the length of an arc corresponding to each of the regions $821b$-$3$ are 6 mm. Ideally, the region $821a$-$m_2$ of the S-pole and the region $821b$-$m_2$ of the N-pole provided on the surface $821$-$m_2$ each are a fan-shaped region centered around the central axis O2. When all of the regions $821b$-$m_2$ of the N-pole are magnetized using a cylindrical magnet with a predetermined diameter (for example, 2 mm) and then, all of the regions $821a$-$m_2$ of the S-pole are magnetized by the magnet with its magnet pole inverted, a texture as illustrated in FIG. 14B is formed. However, even the regions $821a$-$m_2$ of the S-pole and the regions $821b$-$m_2$ of the N-pole that are not completely fan-shaped as in FIG. 14B are sufficient to present a desired feeling of unevenness.

As illustrated in FIG. 15, the magnetic sheet $810$, which is the "first object", is mounted on the input surface of the touch panel $401$ of the electronic device $400$. Here, the other surface $812$ of the magnetic sheet $810$ (the opposite surface to the surface $811$) is disposed to face the input surface of the touch panel 401. For example, in the case where any position of the touch panel 401 of the electronic device 400 is predetermined to be a region for accepting a rotation input operation (input by a rotation operation), for example, the electronic device 400 displays the region on the touch panel 401, so that the operator disposes the surface 812 of the magnetic sheet 810 in the region. Alternatively, the electronic device 400 may detect in which region of the touch panel 401 the magnetic sheet 810 is mounted, and accept the rotation input operation in the detected region. In this case, the surface 812 of the magnetic sheet 810 may be disposed in any region of the touch panel 401 which can accept the rotation input operation. In addition, the operator may designate which region of the touch panel 401 accepts the rotation input operation. In this case, the electronic device 400 detects which region of the touch panel 401 has been designated, and the operator disposes the surface 812 of the magnetic sheet 810 in the region designated by the input.

In an example of the input interface used by the operator to set the incoming direction of a sound or light to the operator, the upper side of the region accepting the rotation input operation to the touch panel 401 is assigned to the forward direction of the operator (clockwise angle with respect to the orientation of the operator is 0 degree), the lower side of the region accepting the rotation input operation on the touch panel 401 is assigned to the rearward direction of the operator (clockwise angle with respect to the orientation of the operator is 180 degrees), the right side of the region accepting the rotation input operation on the touch panel 401 is assigned to the rightward direction of the operator (clockwise angle with respect to the orientation of the operator is 90 degrees), and the left side of the region accepting the rotation input operation on the touch panel 401 is assigned to the leftward direction of the operator (clockwise angle with respect to the orientation of the operator is 270 degrees). In an example of the input interface used by the operator to set the orientation of the machine, the upper side of the region accepting the rotation input operation to the touch panel 401 is assigned to the north direction, the lower side of the region accepting the rotation input operation to the touch panel 401 is assigned to the south direction, the right side of the region accepting the rotation input operation to the touch panel 401 is assigned to the east direction, and the left side of the region accepting the rotation input operation to the touch panel 401 is assigned to the west direction.

The operator selects any magnetic sheet $820\text{-}m_2$, and disposes the selected magnetic sheet $820\text{-}m_2$ (selected object) such that the surface $822\text{-}m_2$ of the magnetic sheet $820\text{-}m_2$ faces outward, and such that the surface $821\text{-}m_2$ of the magnetic sheet $820\text{-}m_2$ is in contact with the surface 811 of the magnetic sheet 810. The magnetic sheet $820\text{-}m_2$ is disposed on the magnetic sheet 810 such that the center axis O1 and the center axis O2 match or come close to each other.

Figure 14C:
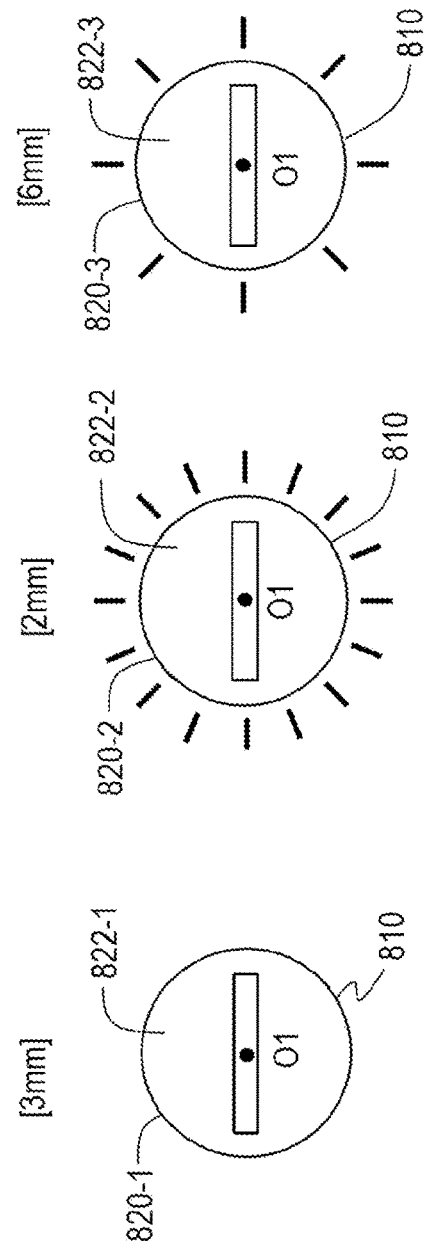
FIG. 14C is a conceptual drawing illustrating examples of a feeling of unevenness.

The operator performs an operation of changing the relative positional relationship between the surface 811 and the surface $821\text{-}m_2$ while touching, with a finger, the surface $822\text{-}m_2$ of the magnetic sheet $820\text{-}m_2$ disposed on the magnetic sheet 810 and bringing the surface 811 and the surface $821\text{-}m_2$ into contact with or proximity to each other. In the example in FIG. 15, the relative positional relationship between the surface 811 and the surface $821\text{-}m_2$ is changed (rotated) in the circumferential direction R1 or R2 around the axis. As a result, the input operation to the touch panel 401 (the operation of setting the parameter to a desired value by rotation of the dial, that is, the dial input operation or the rotation input operation) is performed, and a shear stress in the axial direction R1 or R2 received by the operator from the magnetic sheet $820\text{-}m_2$ changes periodically. Thus, the operator perceives a feeling of unevenness in a direction substantially orthogonal to the surface $821\text{-}m_2$. As described above, each magnetic sheet $820\text{-}m_2$ has a different magnetization pattern of the regions $821a\text{-}m_2$ and $821b\text{-}m2$. Therefore, the maximum value of the shear stress and/or the period of the shear stress received by the operator from the magnetic sheet $820\text{-}m_2$ is different depending on a combination of the magnetic sheet 810 and the selected magnetic sheet $820\text{-}m_2$, which makes different a feeling of unevenness perceived by the operator. In other words, even when the same magnetic sheet 810 is used, the operator perceives a different feeling of unevenness according to the selected magnetic sheet $820\text{-}m_2$. That is, the operator can perceive a different feeling of touch merely by changing the magnetic sheet $820\text{-}m_2$. For example, as illustrated in FIG. 14C, when selecting the magnetic sheet 820-1 and performing a rotation input operation to the touch panel 401, the operator can smoothly perform the rotation input operation without perceiving a feeling of unevenness, that is, a feeling of clicking. When selecting the magnetic sheet 820-2, the operator can also perform the same rotation input operation while perceiving a feeling of unevenness at small intervals (for example, a feeling of unevenness in W stages), that is, a feeling of clicking in W stages. The operator can also select the magnetic sheet 820-3 to perform the same rotation input operation while perceiving a feeling of unevenness at large intervals (for example, a feeling of unevenness in W' stages), that is, a feeling of clicking in W' stages.

FEATURES OF THE PRESENT EMBODIMENT

In the present embodiment, when inputting information to the touch panel, the operator who inputs the information can perceive a feeling of unevenness. Even when the same "first object" is used, a different feeling of unevenness can be presented by changing the "second object". Note that an image may be displayed on the touch panel 401 or a sound output from the speaker of the electronic device 400 may be changed according to the input operation. In addition, for example, stage illumination, which is controlled by input to the touch panel, can be gradually and discretely controlled by using the "second object" that presents a feeling of clicking, thereby enabling up-tempo performance. After that, the gradation of proof can be smoothly adjusted by changing the above "second object" to another "second object" that does not present a feeling of clicking, so that the up-tempo performance can be instantly switched to slow-tempo performance.

Modification Example 1 of Second Embodiment

Figure 16:
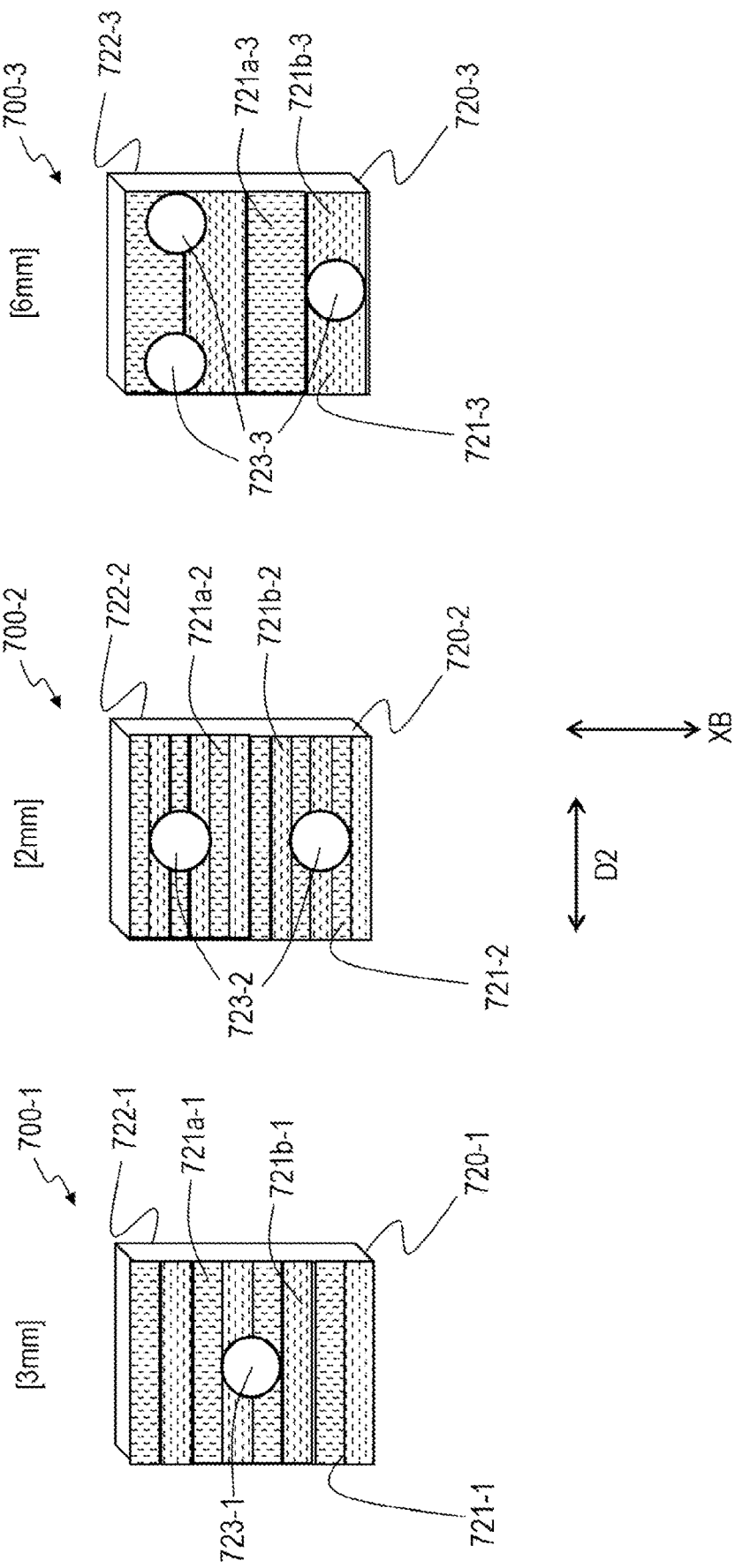
FIG. 16 is a diagram illustrating examples of the second object.

Similar to the modification example 1 of the first embodiment, in the second embodiment as well, the electronic device 400 may identify each "second object", and a combination of information input to the touch panel and a feeling of unevenness presented to the operator may be different for each "second object". This example is defined as a modification example 1 of the second embodiment and only differences from the second embodiment will be described.
<Slider-Type>
FIG. 16 illustrates examples of a slider-type "second object" in the present modification example. Each "second object" $700\text{-}m_2$ includes a magnetic sheet $720\text{-}m_2$ and a conductive portion $723\text{-}m_2$ on one surface. On one surface $721\text{-}m_2$ (second surface) of the magnetic sheet $720\text{-}m_2$, a texture (second texture) including regions $721a$-$m_2$ of the S-pole and regions $721b$-$m_2$ of the N-pole is magnetized. The surface $721$-$m_2$ of the magnetic sheet $720$-$m_2$ and the conductive portion $723$-$m_2$ are disposed to face the surface 711 of the magnetic sheet 710.

The magnetic sheet $720$-$m_2$ of the "second object" $700$-$m_2$ in the example illustrated in FIG. 16 is the same as the magnetic sheet $720$-$m_2$ of the second embodiment in FIG. 13B.

The conductive patterns of the conductive portions 723-1, . . . , $M_2$ of the "second objects" 700-1, . . . , $M_2$ are different from each other. In the example in FIG. 16, the conductive pattern of the conductive portion 723-1 includes a single circular conductor having a diameter of 6 mm, the conductive pattern of the conductive portion 723-2 includes two circular conductors having a diameter of 6 mm, and the conductive pattern of the conductive portion 723-3 includes three circular conductors having a diameter of 6 mm.

The operator selects any of the "second objects" $700$-$m_2$ and disposes the selected "second object" $700$-$m_2$ (selected object) on the surface 711 of the magnetic sheet 710. The method of disposing the selected object is the same as the method in the second embodiment.

The operator performs an operation of changing the relative positional relationship between the surface $721$-$m_2$ and the conductive portion $723$-$m_2$, and the surface 711 while touching, with a finger, the "second object" $700$-$m_2$ disposed on the magnetic sheet 710 (a portion of the "second object" $700$-$m_2$ that does not face the surface 711) and bringing the surface $721$-$m_2$ and the conductive portion $723$-$m_2$ into contact with or proximity to the surface 711. The electronic device 400 detects the position and the conductive pattern of the conductive portion $723$-$m_2$ that is in contact with or proximity to the touch panel 401, and sets, as a parameter value, a value corresponding to the detected position for a parameter predetermined for each detected conductive pattern. For example, when the selected object is the "second object" 700-1, the volume of a sound output from the speaker is used as a parameter to be operated, and a value corresponding to the detected position is set as a sound volume value. When the selected object is the "second object" 700-2, the brightness of illumination is used as a parameter to be operated, a value corresponding to the detected position is set as a brightness value. In this manner, a parameter is set among multiple types of predetermined parameters, that is, information input to the touch panel can be associated with a force sense presented to the operator.

<Dial-Type>

Figure 17:
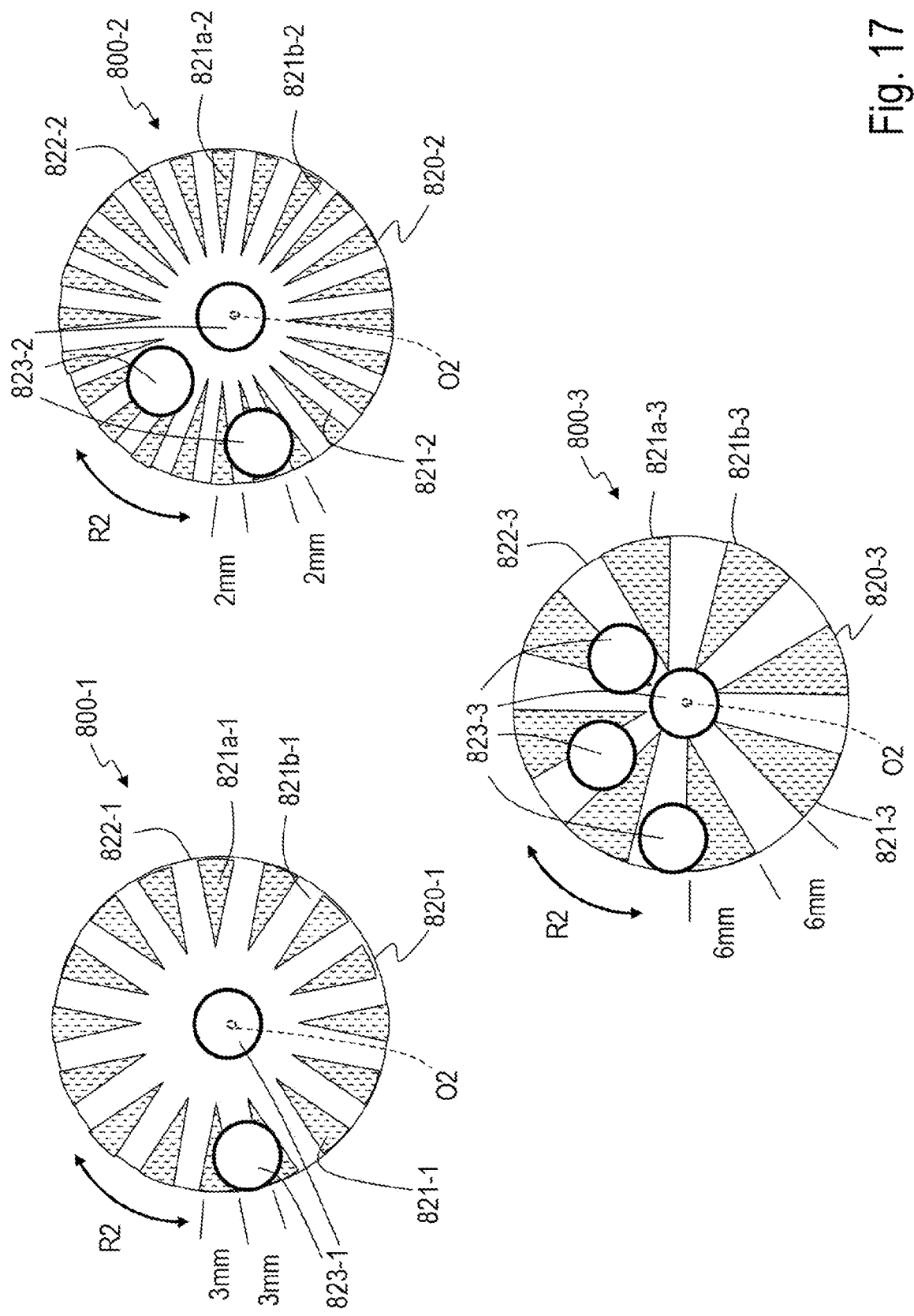
FIG. 17 is a diagram illustrating examples of the second object.

FIG. 17 illustrates examples of a dial-type "second object" in the present modification example. Each "second object" $800$-$m_2$ includes a magnetic sheet $820$-$m_2$ and a conductive portion $823$-$m_2$ on one surface. On one surface $821$-$m_2$ (second surface) of the magnetic sheet $820$-$m_2$, a texture (second texture) including regions $821a$-$m_2$ of the S-pole and regions $821b$-$m_2$ of the N-pole is magnetized. The surface $821$-$m_2$ of the magnetic sheet $820$-$m_2$ and the conductive portion $823$-$m_2$ are disposed to face the surface 811 of the magnetic sheet 810.

The magnetic sheet $820$-$m_2$ of the "second object" $800$-$m_2$ in the example illustrated in FIG. 17 is the same as the magnetic sheet $820$-$m_2$ of the second embodiment in FIG. 14B.

The conductive patterns of the conductive portions 823-1, . . . , $M_2$ of the "second objects" 800-1, . . . , $M_2$ are different from each other. In the example in FIG. 17, the conductive pattern of the conductive portion 823-1 includes one circular conductor having a diameter of 6 mm located at the center and one circular conductor having a diameter of 6 mm located near the circumference. The conductive pattern of the conductive portion 823-2 includes one circular conductor having a diameter of 6 mm located at the center, one circular conductor having a diameter of 6 mm located near the circumference, and one circular conductor located at a position that is not close to the center or circumference. The conductive pattern of the conductive portion 823-3 includes one circular conductor having a diameter of 6 mm located at the center, one circular conductor having a diameter of 6 mm located near the circumference, and two circular conductors located at different positions that are not close to the center or circumference and having different distances from the center.

The operator selects any of the "second objects" $800$-$m_2$ and disposes the selected "second object" $800$-$m_2$ (selected object) on the surface 811 of the magnetic sheet 810. The method of disposing the selected object is the same as the method in the second embodiment.

The operator performs an operation of changing the relative positional relationship between the surface $821$-$m_2$ and the conductive portion $823$-$m_2$, and the surface 811 while touching, with a finger, a portion of the "second object" $800$-$m_2$ disposed on the magnetic sheet 810 and bringing the surface $821$-$m_2$ and the conductive portion $823$-$m_2$ into contact with or proximity to the surface 811. The above portion of the "second object" $800$-$m_2$ is a portion that does not face the surface 811. The electronic device 400 detects the position and the conductive pattern of the conductive portion $823$-$m_2$ that is in contact with or proximity to the touch panel 401, and sets, as a parameter value, a value corresponding to the detected rotation position for a parameter predetermined for each detected conductive pattern. For example, when the selected object is the "second object" 800-1, the incoming direction of a sound is used as a parameter to be operated, a value corresponding to the detected position is set as an angle value of the incoming direction. When the selected object is the "second object" 800-2, the position of illumination is used as a parameter to be operated, a value corresponding to the detected position is set as an angle value of the position of the illumination. In this manner, a parameter is set among multiple types of predetermined parameters, that is, information input to the touch panel can be associated with a force sense presented to the operator.

Modification Example 2 of Second Embodiment

Although a plurality of the "second objects" are used in the modification example 1 of the second embodiment, as in the modification example 2 of the first embodiment, the orientation of one "second object" can be changed, and a combination of information input to the touch panel and a feeling of unevenness presented to the operator may be different for each orientation of the "second object". This example is defined as a modification example 2 of the second embodiment and only differences from the modification example 1 of the second embodiment will be described.

Similar to the modification example 2 of the first embodiment, an example of the "second object" in the present modification example is illustrated in FIG. 11. In other words, the configuration of the "second object" in the present modification example is the same as the configuration of the second object in the modification example 2 of the first embodiment.

The operator in the present modification example performs an operation of changing the relative positional relationship between the surface 521 and the conductive portion 523, and the surface 711 while touching, with a finger, a portion of the "second object" 500 disposed on the magnetic sheet 710 with a following state maintained. The above portion of the "second object" 500 is a portion that does not face the surface 711. The following state is a state in which the surface 521 and the conductive portion 523 are brought into contact with or proximity to (substantially contact with) the surface 711 such that the direction D2A matches the direction D1 or such that the direction D2B matches the direction D1. The electronic device 400 detects the position of the conductive portion 523 that is in contact with or proximity to the touch panel 401 and the orientation of the conductive pattern, and sets, as a parameter value, a value corresponding to the detected position for a parameter predetermined for each detected orientation of the conductive pattern. For example, when the operator uses the "second object" 500 so as to match the direction D2B with the direction D1, the volume of a sound output from the speaker is used as a parameter to be operated, and the electronic device 400 sets a value corresponding to the detected position as a value of the sound volume. When the operator uses the "second object" 500 so as to match the direction D2A with the direction D1, the brightness of illumination is used as a parameter to be operated, and the electronic device 400 sets a value corresponding to the detected position as a value of the brightness. In this manner, a parameter is set among two types of predetermined parameters, that is, information input to the touch panel can be associated with a force sense presented to the operator.

Note that, the magnetic sheet 610 in FIG. 12 may be used as the first object in place of the magnetic sheet 710, and the "second object" 600 in FIG. 12 may be used as the second object.

OTHER MODIFICATION EXAMPLES

In each of the embodiments and the modification examples, as long as a sufficient magnetic force is applied between the magnetic sheet of the "first object" and the magnetic sheet of the "second object", the relative positional relationship between the surfaces (the first surface and the second surface) may be changed in the state in which the two magnetic sheets are in a non-contact state.

Figure 18C:
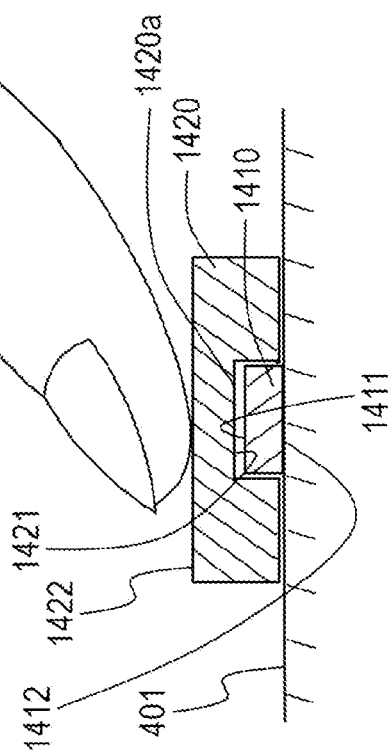
FIGS. 18A to 18C are diagrams illustrating an example of the magnetic sheet supported by a mechanical structure.
Figure 18A:
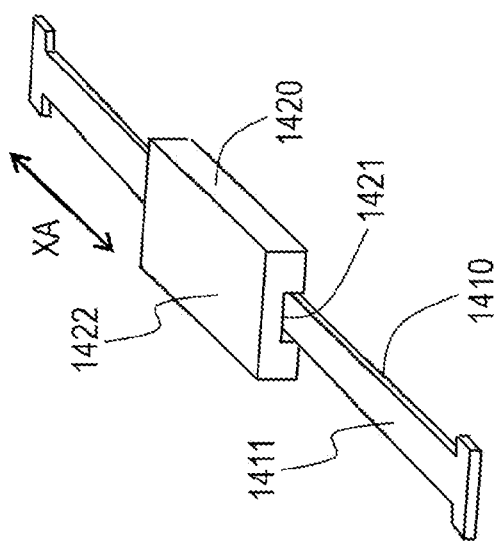
Figure 18B:
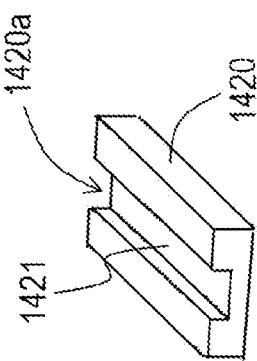

In the case of the first embodiment, the first modification example of the first embodiment, the slider-type "second object" in the second embodiment, and the slider-type "second object" in the first modification example of the second embodiment, as illustrated in FIGS. 18A to 18C, the magnetic sheet of the first object of the "force sense presentation object" may be formed as a rail-like (band-like) magnetic sheet 1420, and the magnetic sheet of the second object may be formed as the magnetic sheet 1420 provided with a groove 1420a. On one surface 1411 (first surface) of the magnetic sheet 1410, a texture (first texture) including regions of the S-pole and regions of the N-pole as described above is magnetized. On a bottom surface 1421 (second surface) on the inner side of the groove 1420a of the magnetic sheet 1420, a texture (second texture) including the regions of the S-pole and the regions of the N-pole as described above is magnetized.

As illustrated in FIG. 18C, the magnetic sheet 1410 is disposed on the input surface of the touch panel 401. The surface 1412 of the magnetic sheet 1410 is disposed to face the input surface of the touch panel 401. A portion of the magnetic sheet 1410 is disposed inside the groove 1420a of the magnetic sheet 1420. As a result, the magnetic sheet 1420 is disposed such that the surface 1422 of the magnetic sheet 1420 faces outward, and such that the surface 1421 of the magnetic sheet 1420 is in contact with or proximity to the surface 1411 of the magnetic sheet 1410. The operator performs an operation of changing the relative positional relationship between the surface 1411 and the surface 1421 (slide operation in the direction XA) while touching the surface 1422 of the magnetic sheet 1420 disposed on the magnetic sheet 1410 and bringing the surface 1411 and the surface 1421 into contact with or proximity to each other. At this time, the magnetic sheet 1420 slides in the XA direction, being supported by the inner wall of the groove 1420a of the magnetic sheet 1420.

Note that in the case of the dial-type "second object" in the second embodiment and the modification example, a fastening fixture may be disposed such that center positions of the first object and the second object are not displaced from each other.

SUPPLEMENT

The matters described in the above embodiments will be summarized below.

The touch panel input devices illustrated in the modification examples 1 to 3 of the first embodiment and the modification examples 1 and 2 of the third embodiment (for example, FIGS. 8, 9 to 12, 16, and 17) each comprise: the "first object (for example, the magnetic sheet 210)" including the "first surface (for example, the surface 211)", the "first texture" including the region of the S-pole and the region of the N-pole being previously magnetized on the "first surface", the "plate surface (for example, the surface 212)" on an opposite side to the "first surface" being disposed to face an input surface of the "touch panel (for example, the touch panel 401')"; and the "second object (for example, the 'second object' $320\text{-}m_2$)" including the "magnetic sheet (for example, the magnetic sheet $220\text{-}m_2$)" and the "conductive portion", the "magnetic sheet" including the "second surface (for example, the surface $221\text{-}m_2$)", the "second texture" including a region of an S-pole and a region of an N-pole being previously magnetized on the "second surface", the "second surface" configured to be disposed to face the "first surface", the "conductive portion (for example, $323\text{-}m_2$)" forming the "conductive pattern" on the "second surface", the "second object" being operated by an operator performing an input operation to the "touch panel".

As illustrated in the modification examples 2 and 3 of the first embodiment and the modification example 2 of the second embodiment (for example, FIGS. 11 and 12), for example, the arrangement pattern of the region of the S-pole and the region of the N-pole in the "second texture" of the "magnetic sheet" of the "second object ("second objects" 500 and 610)" is different between when the "second surface" of the "second object" is viewed from the certain direction (hereinafter referred to as the "first direction") (for example, the direction D2A, that is, the arrow direction D2A in the example in FIG. 12B) and when the "second surface" of the "second object" is viewed from the direction different from the "first direction" (hereinafter referred to as the "second direction") (for example, the direction D2B, that is, in the example in FIG. 12B, the direction opposite to the arrow direction D2A, the arrow direction D2B, and the direction opposite to the arrow direction D2B), and the "conductive pattern" of the "conductive portion" of the "second object" is different between when the "second surface" of the "second object" is viewed from the "first direction" and when the "second surface" of the "second object" is viewed from the "second direction". For example, the "first texture" includes the first repeating region where regions of the S-pole and regions of the N-pole are repeatedly disposed along the particular "first line (for example, in the direction D1A and/or the direction D1B)" included in the "first surface", the "second texture" includes the second repeating region where regions of the S-pole and regions of the N-pole are repeatedly disposed along the particular "second line (for example, in the direction D2A and/or the direction D2B)" included in the "second surface", and the "second object" is configured to be disposed in the arrangement in which the "first line" of the "first object" matches or approximates the "second line" of the "second object", or in another arrangement.

As illustrated in the modification examples 1 of the first and second embodiments (for example, FIGS. 15 and 16), for example, the touch panel input device comprises a plurality of the "second objects (for example, the second object 700-$m_2$)", wherein the plurality of "second objects" differ from each other in the arrangement pattern of the regions of the S-pole and the regions of the N-pole of the "second texture", and in the "conductive pattern (for example, the conductive portion 723-$m_2$)" of the "conductive portion". For example, the "first texture" includes the first repeating region where regions of the S-pole and regions of the N-pole are repeatedly disposed along a particular "first line (for example, in the direction XA)" included in the "first surface", the "second texture" includes the second repeating region where regions of the S-pole and regions of the N-pole are repeatedly disposed along the particular "second line (for example, in the direction XB)" included in the "second surface", and the "second object" is configured to be disposed such that the "first line" of the first object matches or approximates the "second line" of the "second object".

For example, as illustrated in the modification example 1 of the second embodiment (for example, FIGS. 15 and 17), the "first texture" includes the first repeating region where the regions of the S-pole and the regions of the N-pole are repeatedly disposed along the circumferential direction around the "first axis (for example, the central axis O1)" substantially perpendicular to the "first surface", the "second texture" includes the second repeating region where the regions of the S-pole and the regions of the N-pole are repeatedly disposed along the circumferential direction around the "second axis (for example, the central axis O2)" substantially perpendicular to the "second surface", and the "second object (for example, the "second object" 800-$m_2$)" is configured to be disposed such that the "first axis" of the "first object (for example, the magnetic sheet 810)" matches or approximates the "second axis" of the "second object".

As illustrated in the second embodiment (for example, FIGS. 15 and 16), for example, in touch panel input device for inputting a value of the "parameter" of the electronic device to the "touch panel (for example, the touch panel 401)", the "touch panel" being an input measure of the electronic device (for example, the electronic device 400), values of the parameter from the minimum value to the maximum value are assigned on the certain "line segment" on the "touch panel" (for example, on the line segment in the XA direction) in ascending order or descending order, the touch panel input device comprises: the "first object" including the "first surface", the first repeating region where regions of the S-pole and regions of the N-pole are repeatedly disposed along the particular "first line (for example, in the XA direction)" being previously magnetized on the "first surface", the plate surface on the opposite side to the "first surface" being disposed to face the input surface of the "touch panel"; and the "second object" including the magnetic sheet including the "second surface", the second repeating region where regions of the S-pole and regions of the N-pole are repeatedly disposed along the particular "second line (for example, in the XB direction)" being previously magnetized on the "second surface", the "second surface" being disposed to face the "first surface", the "second object" being operated by an operator performing the input operation to the "touch panel", and the "first object" and the "second object" are disposed such that the "line segment" on the "touch panel", the "first line" of the "first object", the "second line" of the "second object" match or approximate one another.

As illustrated in the second embodiment (for example, FIGS. 15 and 17), for example, in the touch panel input device for inputting the value of the parameter of the "electronic device (for example, the electronic device 400)" to the "touch panel (for example, the touch panel 401)", the "touch panel" being an input measure of the "electronic device", values of the parameter are assigned on the "touch panel" in the circumferential direction around the "first axis (for example, the central axis O1 and/or O2)" substantially perpendicular to the "touch panel" according to the predetermined rule, the touch panel input device comprises: the first object (for example, the magnetic sheet 810) including the "first surface", the first repeating region where regions of the S-pole and regions of the N-pole are repeatedly disposed along the circumferential direction around the "second axis (for example, the central axis O1)" substantially perpendicular to the "first surface" being previously magnetized on the "first surface", the plate surface on the opposite side to the "first surface" being disposed to face the input surface of the "touch panel"; and the "second object (for example, the second object 800-$m_2$)" including the magnetic sheet (for example, the magnetic sheet 820-$m_2$) including the "second surface", the second repeating region where regions of the S-pole and regions of the N-pole are repeatedly disposed along the circumferential direction around the "third axis (for example, the central axis O2)" substantially perpendicular to the "second surface" being previously magnetized on the "second surface", the "second surface" being disposed to face the "first surface", the "second object" being operated by the operator performing an input operation to the "touch panel", and the "first object" and the "second object" are disposed such that the "first axis", the "second axis", and the "third axis" match or approximate one another.

REFERENCE SIGNS LIST 210 to 260, 210' to 260', 520, 610, 620, 710, 720-$m_2$, 810, 820-$m_2$ Magnetic sheet
320-$m_2$, 500, 600, 700-$m_2$, 800-$m_2$ Second object
323-$m_2$, 523, 623, 723-$m_2$, 823-$m_2$ Conductive portion
324-$m_2$, 624 Knob
401, 401' Touch panel

The invention claimed is:
1. A touch panel input device for performing input to a touch panel of an electronic device, the touch panel input device comprising:
   a first object including a first surface, a first texture in which S-pole regions and N-pole regions are repeatedly arranged in an alternate manner being previously magnetized on the first surface, a plate surface on an opposite side to the first surface being disposed to face a front surface of the touch panel of the electronic device, and the first object being a magnetic sheet disposed on the front surface of the touch panel of the electronic device; and a second object including a magnetic sheet and a conductive portion, the magnetic sheet including a second surface, a second texture in which S-pole regions and N-pole regions are repeatedly arranged in an alternate manner being previously magnetized on the second surface, the second surface configured to be disposed to face the first surface, the conductive portion forming a conductive pattern on the second surface, the second object being worn, gripped, or supported, and operated by an operator performing an input operation to the touch panel.

2. The touch panel input device according to claim 1, comprising a plurality of the second objects, wherein the plurality of the second objects differ from each other in an alternate repeatedly pattern of the S-pole regions and the N-pole regions of the second texture, and in the conductive pattern of the conductive portion, and any one second object of the plurality of the second objects is selected, the second surface of the selected second object is disposed to face the first surface of the first object.

3. A touch panel input device for performing input to a touch panel, the touch panel input device comprising:

a first object including a first surface, a first texture including a region of an S-pole and a region of an N-pole being previously magnetized on the first surface, a plate surface on an opposite side to the first surface being disposed to face an input surface of the touch panel; and a second object including a magnetic sheet and a conductive portion, the magnetic sheet including a second surface, a second texture including a region of an S-pole and a region of an N-pole being previously magnetized on the second surface, the second surface configured to be disposed to face the first surface, the conductive portion forming a conductive pattern on the second surface, the second object being operated by an operator performing an input operation to the touch panel, wherein an arrangement pattern of the region of the S-pole and the region of the N-pole in the second texture of the magnetic sheet of the second object is different between when the second surface of the second object is viewed from a first direction and when the second surface of the second object is viewed from a second direction different from the first direction, and the conductive pattern of the conductive portion of the second object is different between when the second surface of the second object is viewed from the first direction and when the second surface of the second object is viewed from the second direction.

4. The touch panel input device according to claim 3, wherein the first texture includes a first repeating region where regions of an S-pole and regions of an N-pole are repeatedly disposed along a particular first line included in the first surface, the second texture includes a second repeating region where regions of an S-pole and regions of an N-pole are repeatedly disposed along a particular second line included in the second surface, and the second object is configured to be disposed in an arrangement in which the first line of the first object matches or approximates the second line of the second object, or in another arrangement.

5. The touch panel input device according to claim 3, wherein the first texture includes a first repeating region where regions of the S-pole and regions of the N-pole are repeatedly disposed along a circumferential direction around a first axis substantially perpendicular to the first surface, the second texture includes a second repeating region where regions of the S-pole and regions of the N-pole are repeatedly disposed along a circumferential direction around a second axis substantially perpendicular to the second surface, and the second object is configured to be disposed such that the first axis of the first object matches or approximates the second axis of the second object.

6. A touch panel input device for performing input to a touch panel, the touch panel input device comprising:

a first object including a first surface, a first texture including a region of an S-pole and a region of an N-pole being previously magnetized on the first surface, a plate surface on an opposite side to the first surface being disposed to face an input surface of the touch panel;

a second object including a magnetic sheet and a conductive portion, the magnetic sheet including a second surface, a second texture including a region of an S-pole and a region of an N-pole being previously magnetized on the second surface, the second surface configured to be disposed to face the first surface, the conductive portion forming a conductive pattern on the second surface, the second object being operated by an operator performing an input operation to the touch panel; and a plurality of the second objects, wherein the plurality of the second objects differ from each other in an arrangement pattern of the region of the S-pole and the region of the N-pole of the second texture, and in the conductive pattern of the conductive portion, the first texture includes a first repeating region where regions of an S-pole and regions of an N-pole are repeatedly disposed along a particular first line included in the first surface, the second texture includes a second repeating region where regions of an S-pole and regions of an N-pole are repeatedly disposed along a particular second line included in the second surface, and the second object is configured to be disposed such that the first line of the first object matches or approximates the second line of the second object.

7. A touch panel input device for performing input to a touch panel, the touch panel input device comprising:

a first object including a first surface, a first texture including a region of an S-pole and a region of an N-pole being previously magnetized on the first surface, a plate surface on an opposite side to the first surface being disposed to face an input surface of the touch panel;

a second object including a magnetic sheet and a conductive portion, the magnetic sheet including a second surface, a second texture including a region of an S-pole and a region of an N-pole being previously magnetized on the second surface, the second surface configured to be disposed to face the first surface, the conductive portion forming a conductive pattern on the second surface, the second object being operated by an operator performing an input operation to the touch panel; and a plurality of the second objects, wherein the plurality of the second objects differ from each other in an arrangement pattern of the region of the S-pole and the region of the N-pole of the second texture, and in the conductive pattern of the conductive portion, the first texture includes a first repeating region where regions of the S-pole and regions of the N-pole are repeatedly disposed along a circumferential direction around a first axis substantially perpendicular to the first surface, the second texture includes a second repeating region where regions of the S-pole and regions of the N-pole are repeatedly disposed along a circumferential direction around a second axis substantially perpendicular to the second surface, and the second object is configured to be disposed such that the first axis of the first object matches or approximates the second axis of the second object.

\* \* \* \* \*